United States Patent
Mizoguchi et al.

(10) Patent No.: US 6,215,460 B1
(45) Date of Patent: Apr. 10, 2001

(54) HEAD-MOUNTED IMAGE DISPLAY APPARATUS

(75) Inventors: Motoshi Mizoguchi, Kanagawa; Masahiko Ito, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/322,749

(22) Filed: Oct. 12, 1994

Related U.S. Application Data

(63) Continuation of application No. 08/130,563, filed on Oct. 1, 1993, now abandoned.

(30) Foreign Application Priority Data

Oct. 9, 1992 (JP) .................................................. 4-270680

(51) Int. Cl.⁷ ...................................................... G09G 5/00
(52) U.S. Cl. .................................................. 345/8; 345/7
(58) Field of Search .................... 345/7, 8, 9; 359/13, 359/629, 630, 631, 632, 633; 351/158

(56) References Cited

U.S. PATENT DOCUMENTS

| | | |
|---|---|---|
| 770,470 | 9/1904 | Mills . |
| 2,660,921 | 12/1953 | Gaulke . |
| 2,955,156 * | 10/1960 | Heilig ..................... 358/88 |
| 3,376,381 * | 4/1968 | Ratliff ..................... 358/88 |

(List continued on next page.)

FOREIGN PATENT DOCUMENTS

| | | |
|---|---|---|
| 0077193 | 4/1983 | (EP) . |
| 0084964 | 8/1983 | (EP) . |
| 0257409 | 3/1988 | (EP) . |
| 0403701 | 12/1990 | (EP) . |
| 0438362 | 7/1991 | (EP) . |
| 0454443 | 10/1991 | (EP) . |
| 0551781 * | 7/1993 | (EP) . |
| 354738 | 10/1905 | (FR) . |
| 2490352 | 3/1982 | (FR) . |
| 26265 | of 1912 | (GB) . |
| 1264343 | 2/1972 | (GB) . |
| 2123976 | 2/1984 | (GB) . |
| 2166887 | 5/1986 | (GB) . |
| 2206421 | 1/1989 | (GB) . |
| 5-91582 | 4/1993 | (JP) . |
| 9104508 | 4/1991 | (WO) . |
| 9207292 | 4/1992 | (WO) . |

OTHER PUBLICATIONS

United States Statutory Invention Registration, Reg. No. H833, Published Nov. 6, 1990, Inventor: James H. Brindle.

A miniature Virtual Display Implement, Optoelectronics, vol. 6, No. 1, pp. 155–162, Jun., 1991.

Lindsay, R.B. "Physical Mechanics", 3rd Ed. Van Nostrand 1961, pp. 37–40, 404–412.

*Primary Examiner*—Xiao Wu
(74) *Attorney, Agent, or Firm*—Ronald P. Kananen; Rader, Fishman & Grauer

(57) ABSTRACT

A head-mounted image display apparatus includes optical visual units mounted on a laterally disposed shaft and adjustable so as to be movable toward and away from each other for establishing a correct eye spacing for a user. LCD display panels are mounted within the optical visual units so as to be vertically movable while ocular lenses onto which images displayed by the LCDs are projected via an obliquely arranged mirror are positionally fixed relative the eyes of the user such that focus adjustment will not cause image dropout and so that focus and eye spacing may be established independently of each other. Sliders provided for effecting focus and eye spacing adjustment are mounted such that frictional force is applied thereto for providing smooth but sure movement of the sliders so that a set position of the sliders may be reliably maintained. The sliders may be mounted via self a lubricating mounting to improve adjustment smoothness and slide characteristics.

28 Claims, 24 Drawing Sheets

U.S. PATENT DOCUMENTS

| | | |
|---|---|---|
| 3,712,714 | 1/1973 | Uyeda et al. . |
| 3,945,716 | 3/1976 | Kinder . |
| 4,021,846 | 5/1977 | Roese . |
| 4,048,653 | 9/1977 | Spooner . |
| 4,154,513 | 5/1979 | Goulden . |
| 4,156,292 | 5/1979 | Helm et al. . |
| 4,190,856 | 2/1980 | Ricks . |
| 4,494,837 | 1/1985 | Bommarito . |
| 4,550,984 | 11/1985 | Reymond . |
| 4,559,555 * | 12/1985 | Schoolman ............................ 358/88 |
| 4,636,866 | 1/1987 | Hattori . |
| 4,695,129 * | 9/1987 | Faessen ................................. 345/8 |
| 4,706,117 | 11/1987 | Schoolman . |
| 4,755,664 * | 7/1988 | Holmes .................................. 345/7 |
| 4,933,755 | 6/1990 | Dahl et al. . |
| 4,952,024 | 8/1990 | Gale . |
| 4,969,714 | 11/1990 | Fournier, Jr. et al. . |
| 4,982,278 | 1/1991 | Dahl et al. . |
| 5,003,300 | 3/1991 | Wells . |
| 5,034,809 | 7/1991 | Kotoh . |
| 5,093,567 | 3/1992 | Staveley . |
| 5,124,840 | 6/1992 | Trumbull et al. . |
| 5,129,716 * | 7/1992 | Holakovszky ...................... 358/88 |
| 5,187,503 | 2/1993 | Hilton . |
| 5,276,471 | 1/1994 | Yamauchi et al. . |
| 5,281,957 | 1/1994 | Schoolman . |

* cited by examiner

HEAD-MOUNTED IMAGE DISPLAY APPARATUS

This application is a continuation of application Ser. No. 08/130,563 filed Oct. 1, 1993, now abandoned.

BACKGROUND OF THE INVENTION

1. Field of the Invention

The present invention relates generally to a eyeglass type image display apparatus which permits monitoring of an image, such as a video or television image, in an immediate form via a pair of ocular lenses.

2. Description of the Prior Art

Eye glass type image display devices, or 'head mounted' image displays, have been disclosed, for example, in Japanese Patent Application (First Publication) 3-251667 by the present applicant. Such a conventional eye glass type image display device will be discussed hereinbelow with reference to FIGS. 34 and 35.

In the drawings, a head-mounted image display apparatus 100 has a front frame 101, comprising an essentially rectangular body portion, retained by a pair of bows 102, 102 to be held to the head of a user in a manner similar to a pair of eyeglasses. Also provided at a lower center portion of the front frame 101 are an inverted V-shaped nose pad 101a and an inverted V-shaped reflector 103. As best seen in FIG. 34, mounted at a position above the reflector 103, a fluorescent tube 104 is provided. At both sides of the reflector 103, color liquid crystal display (LCD) panels 105, 105 (image display means) are arranged. For each of the LCD panels 105, 105, a convex focus lens is formed substantially integrally therewith via deflection panels 107, 107 Mounted within the front frame 101, so as to be positioned at the inner sides of left and right eyes of user, focusing lenses 106, 106 are provided and, ocular lenses 108, 108 are mounted in a position so as to be in front of the left and right eyes of a user respectively Reflectors 109, 109, of a rectangular plate type, are arranged so as to reflect images focused through the focusing lenses 106, 106 to the ocular lenses 108, 108.

It will also be noted in FIG. 35 that earphone cups 102a, 102a are provided on each of the bows 102, 102 which may be utilized to provide sound accompaniment to images supplied to the image display means.

As seen in the explanatory diagram of FIG. 34, when such a conventional head mounted image display apparatus 100 is worn over the face of a user, images formed on the pair of LCD panels 105, 105, from a VTR or the like, are irradiated by the fluorescent tube 104 and projected in enlarged form on the retinas a, a of the left and right eyes A, A of the user, via the focusing lenses 106, 106, the reflectors 109, 109 and the ocular lenses 108, 108. The virtual image reflected on the ocular lenses are adjustable to establish a comfortable viewing distance for the user.

However, in such conventional head-mounted image display apparatus as described above, since the reflector 103 is mounted above the nose pad to assist in projecting the images displayed on the LCD panels 105, 105, to the eyes by lateral deflection, it is difficult to enlarge the nose pad portion of the apparatus such that the reflector 103 will not contact the user's nose. That is, when a user having a larger nose wears the display apparatus 100, it is difficult to match the left and right eye positions of the user with the positions of the ocular lenses 108, 108. Further, since the LCD panels 105, 105, cannot be moved closer to the reflector 103, the conventional apparatus cannot be adapted for users who have a substantially small distance between their eyes. In addition, since focusing adjustments are made by moving the respective ocular lenses 108, 108 so as to vary a distance between the eyes A, A and the ocular lenses 108, 108, it is possible that a portion of the image may 'drop out', that is to say, to be beyond the focal range of the ocular lenses 108, 108, at some positionings thereof.

Therefore, it has been required to provide a head mounted image display apparatus which is adaptable to a wide range of facial types and in which satisfactory focusing and eye distance adjustment can be easily and reliably carried out.

SUMMARY OF THE INVENTION

It is therefore a principal object of the present invention to overcome the drawbacks of the prior art.

It is a further object of the present invention to provide a head mounted image display apparatus which is adaptable to a wide range of facial types and in which satisfactory focusing and eye distance adjustment can be easily and reliably carried out.

In order to accomplish the aforementioned and other objects, a head-mounted image display apparatus wherein images from a pair of image display means provided in a device body are provided to left and right eyes of a user in enlarged form via reflector means interposed between the image display means and a pair of ocular lenses, is provided in which a pair of optical visual units is provided housing the image display means, the reflector means and the ocular lenses, the optical visual units respectively movable horizontally in directions toward and away from each other.

According to another aspect of the present invention, a head-mounted image display apparatus wherein images from a pair of image display means provided in a device body are provided to left and right eyes of a user in enlarged form via reflector means interposed between the image display means and a pair of ocular lenses is provided, further comprising: a shaft, laterally mounted within the device body; a pair of optical visual units housing the image display means, the reflector means and the ocular lenses, the optical visual units respectively movable horizontally in directions toward and away from each other along the shaft, the ocular lenses being vertically arranged so as to oppose left and right eyes of the user, the reflector means being obliquely arranged between the ocular lenses and the image display means and the image display means being arranged on a horizontal plane and movable in a vertical direction while maintaining a horizontal attitude thereof in relation to the reflector means.

DESCRIPTION OF THE PREFERRED EMBODIMENT

Hereinbelow, a first preferred embodiment of a head-mounted image display apparatus according to the invention will be described in detail with reference to the drawings.

Figure 1:
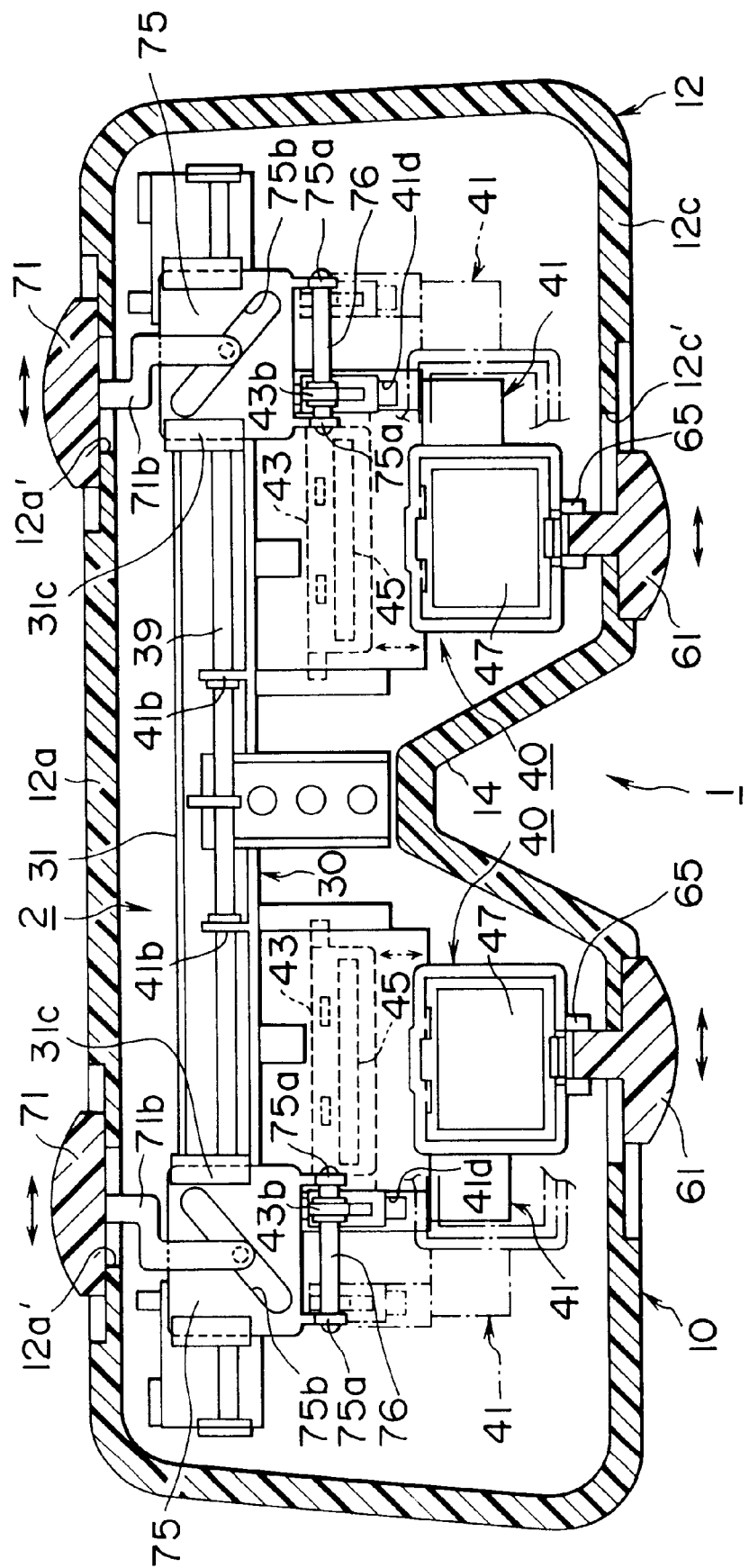
FIG. 1 is a front view of a head-mounted image display apparatus according to a preferred embodiment of the invention.
Figure 2:
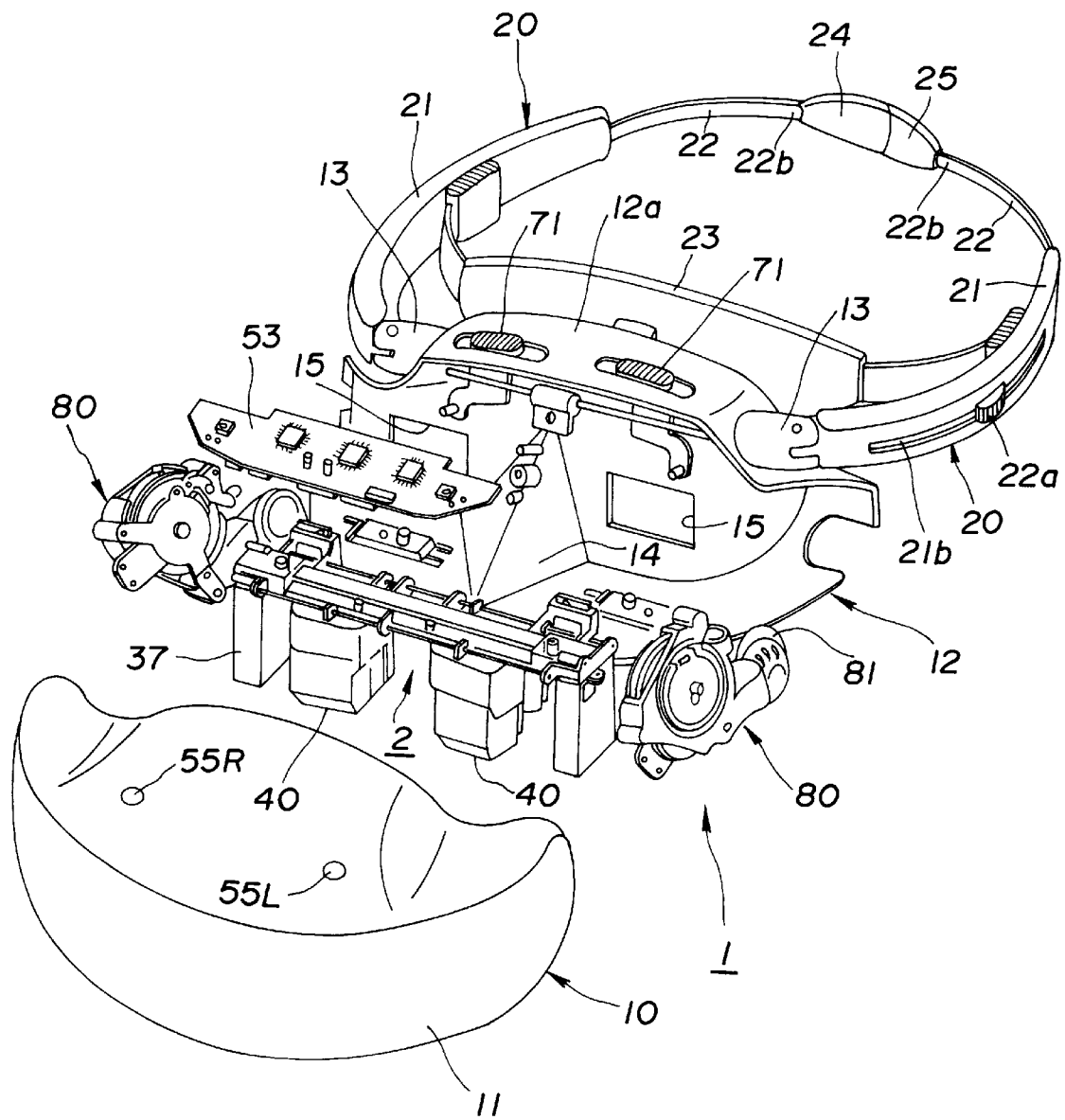
FIG. 2 is an exploded perspective view of the head-mounted image display apparatus of FIG. 1.
Figure 3:
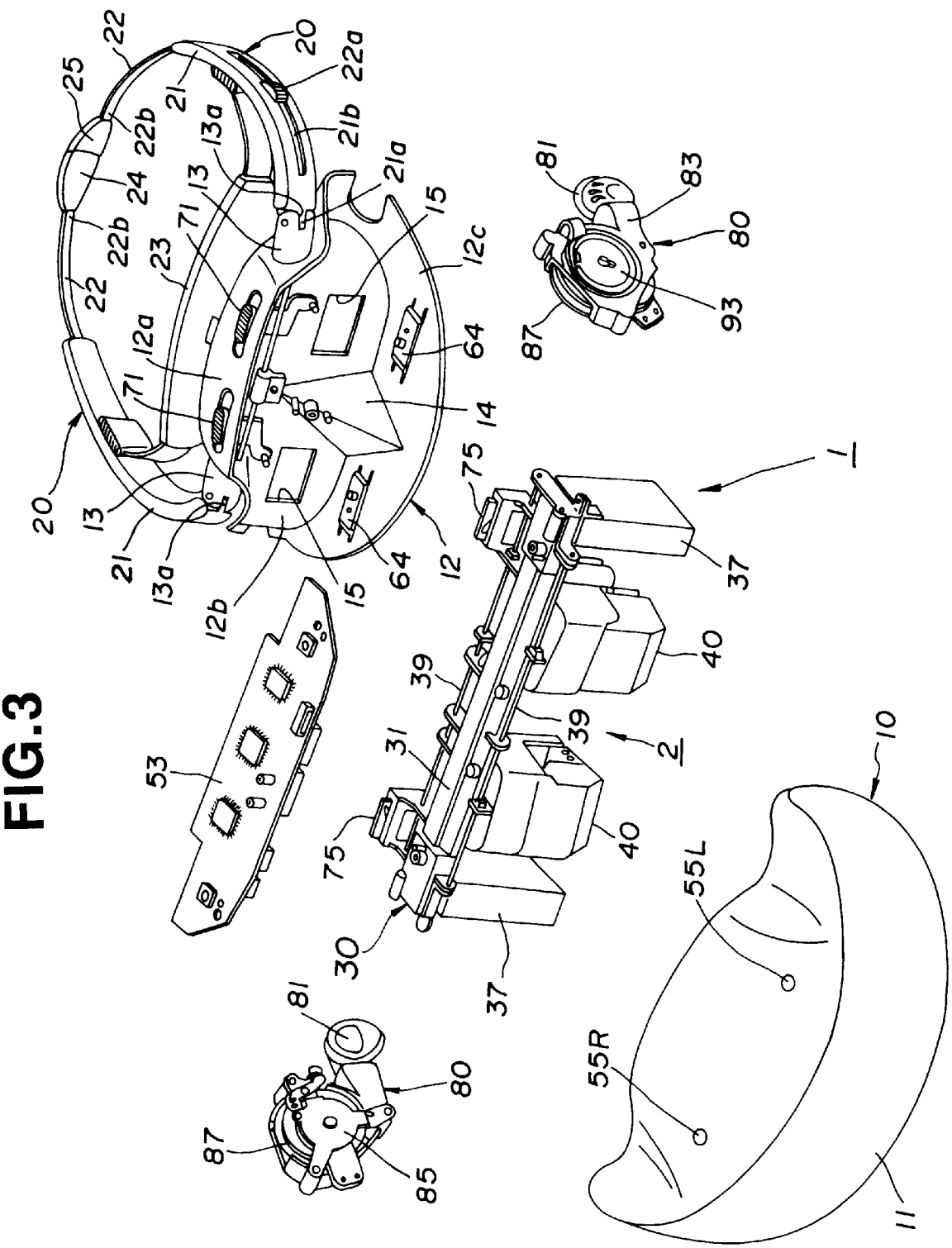
FIG. 3 is an alternative exploded perspective view of the head-mounted image display apparatus of FIG. 1.

Referring now to the drawings, particularly to FIGS. 1–3, a head-mounted image display apparatus 1 according to the invention generally comprises a substantially rectangular (goggle shaped) front frame 10, to be positioned on the face in front of a user's eyes. As seen in FIG. 2, a pair of bows 20, 20 is connected to rear outside portions of the front frame 10 for supporting the head-mounted image display apparatus 1 on the face in a substantially eyeglass type arrangement. An optical visual device 2, including a backlight 30 and a pair of optical visual units 40, 40 are arranged at a front central portion of the front frame 10 and a pair of earphone cup receptacle mechanisms 80, 80 are respectively arranged at each side of the front frame 10.

The front frame 10 comprises a fore cabinet 11 having a channel-shaped longitudinal cross-section and made, for example, of non-transparent synthetic resin, a reverse C-shaped rear cabinet 12, which may also be formed of non-transparent synthetic resin, and which is attached to a rear peripheral edge of the fore cabinet 11 so as to collectively form a hollow box. The rear cabinet has basically an upper, visor portion 12a, a rear, face portion 12b and a lower, shelf portion 12c. On tilted ends of the visor portion 12a, cylindrical projecting portions 13, 13 are integrally formed so as to project horizontally from the sides thereof and, at a central position on the face portion 12b and the shelf portion 12c a substantially triangular nose receptacle 14 is formed. A pair of windows 15, 15 are provided through the face portion 12b of the rear cabinet on either side of the nose receptacle 14, at positions corresponding to eye positions of a user.

As shown in FIGS. 3 and 23–28, the bows 20, 20 of the head-mounted image display apparatus 1 of the invention include front bow portions 21, 21 of a hollow, rectangular configuration and made, for example, of synthetic resin. Rear bow portions 22, 22, made of plate metal, for example, are arranged behind the front bow portion 21, 21 so as to be slidable within the front bow portions 21, 21. A band portion 23 joins the ends of the rear bow portions 22, 22 such that the apparatus as a whole forms a ring shape. Also, at forward ends of the front bow portions 21, 21, hinges 13a, 13a are formed so as to pivotally mount the bows 20, 20 on the projecting portions 13, 13 of the visor portion 12a of the rear cabinet. According to this construction, the rear cabinet 12 is prevented from directly contacting the forehead of a user.

Figure 25:
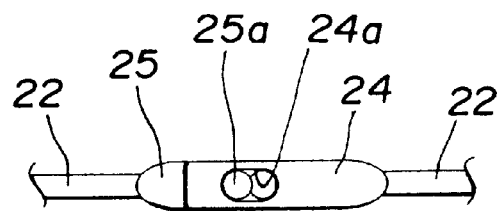
FIG. 25 is an enlarged plan view of a bow connecting portion of the head-mounted image display apparatus.
Figure 26:
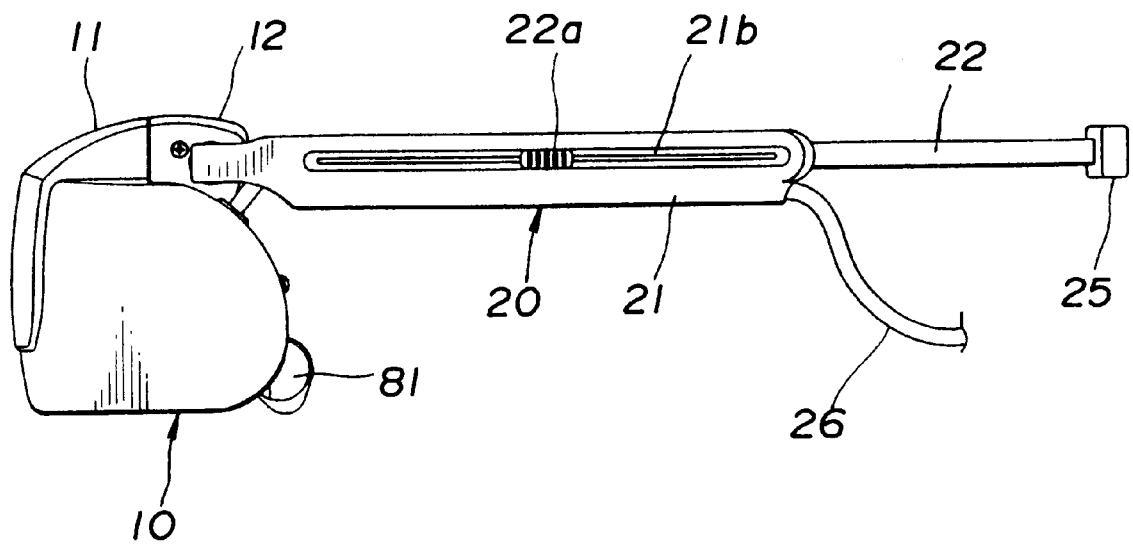
FIG. 26 is a left side view of the head-mounted image display apparatus.
Figure 27:
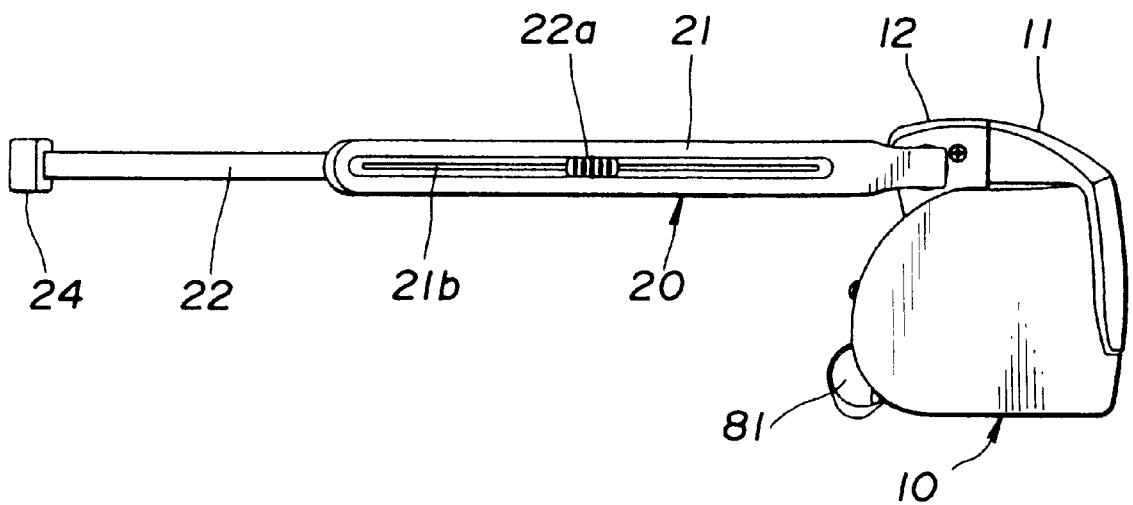
FIG. 27 is a right side view of the headmounted image display apparatus.
Figure 28:
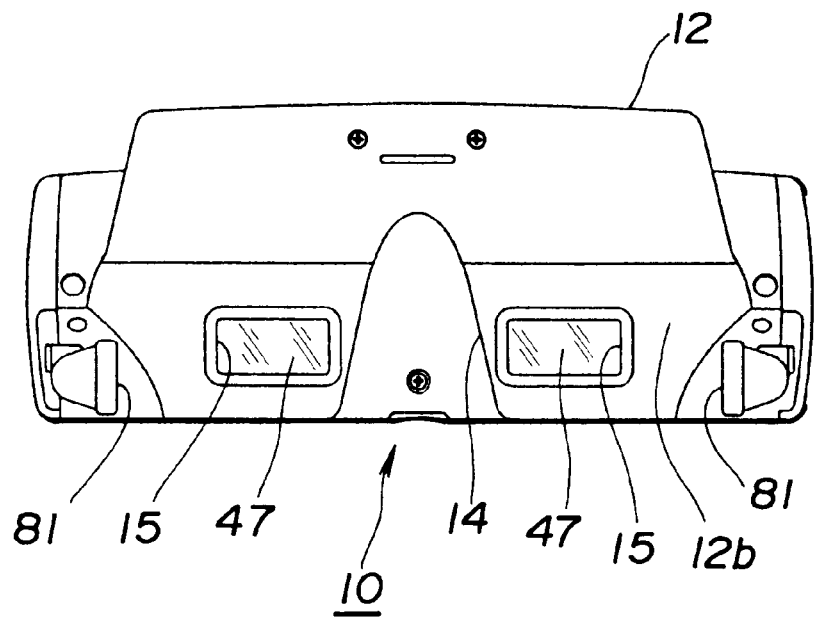
FIG. 28 is a rear view of the head-mounted image display apparatus.
Figure 29:
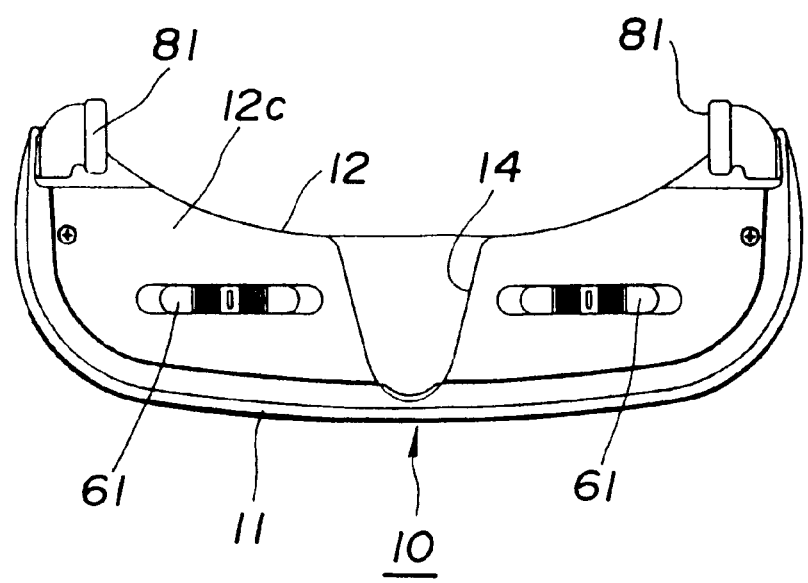
FIG. 29 is a bottom view of the head-mounted image display apparatus.

The front sides of the rear bow portions 22, 22 are provided with knobs 22a, 22a which are arranged to protrude through slits 21b, 21b formed in the outer sides of the front bows 21, 21 such that the rear bows 22, 22 are slidably adjustable. Flexible rubber plates 24, 25 are provided at rear end portions of the rear bows 22, 22 respectively. As best seen in FIG. 25, the rubber plate 24 is provided with a gourd-shaped engaging hole 24a while the rubber plate 25 is formed with a protruding T-shaped rubber boss 25a which is engageable with the engaging opening 24a of the rubber plate 24. Also, according to the present embodiment, as seen in FIG. 26, the left side front bow 21 is provided with a connecting cord 26 for interfacing with a VTR, television, video game, or other imaging source (imaging sources not shown in the drawings).

Figure 5:
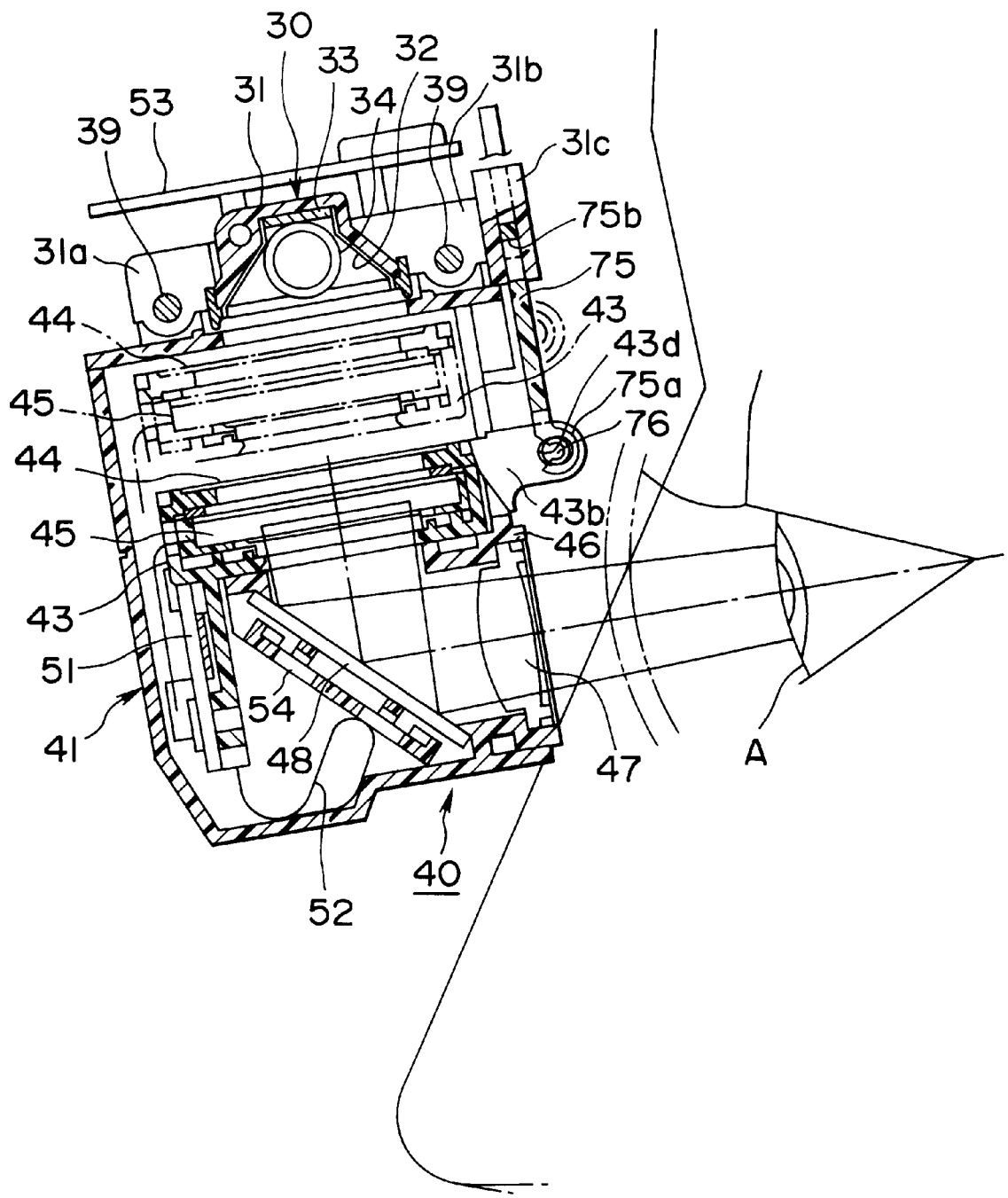
FIG. 5 is a cross-sectional view of the optical visual device of FIG. 4.
Figure 9:
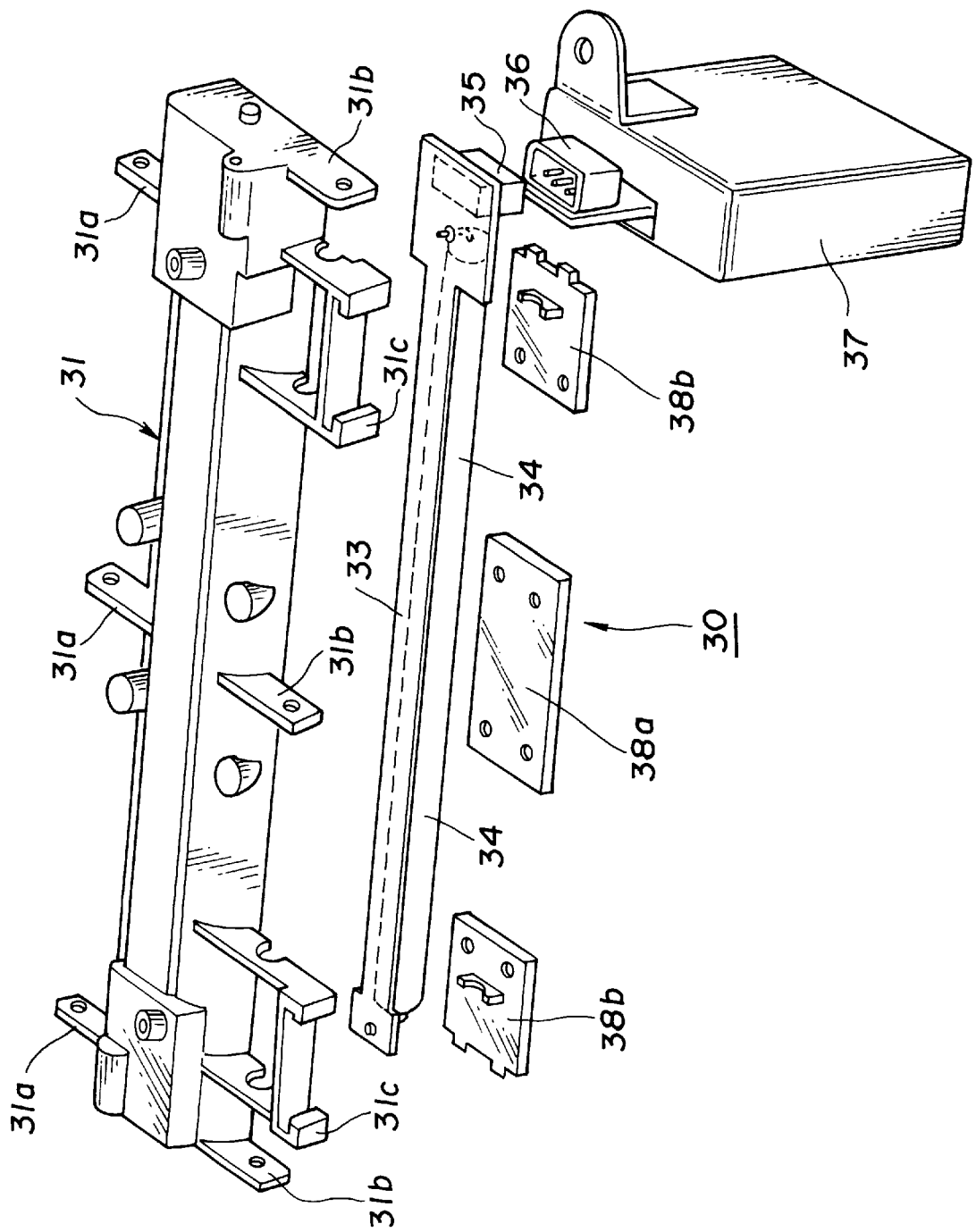
FIG. 9 is an exploded perspective view of a backlight arrangement employed in the head-mounted image display apparatus of the invention.

Referring now to FIGS. 5 and 9, the backlight 30 of the optical visual device 2 has a semi-cylindrical reflector 31 with an inner curved surface having a mirror finished portion 32. As best seen in FIG. 9, the reflector 31, which may be formed of synthetic resin, acts as a frame for a elongated rectangular substrate 33 which is mounted on a center recess of the reflector 31, an elongated fluorescent lamp 34 (FIG. 5) mounted on the substrate, a power source unit 37 connected to the substrate via interlocking connectors 35, 36, a central shielding plate 38a, side shielding plates 38b, 38c for partially closing an upper surface of the recessed portion of the reflector 31 and a pair of shafts 39, 39 (FIG. 5) extending between projected portions 31a . . . , 31b . . . , which project from front and rear surfaces of the reflector 31 respectively.

On the substrate 33, patterning (not shown) is provided for providing suitable illumination from the fluorescent lamp 34. As noted above, interlocking connectors 35, 36 are provided for connecting the substrate 33 and the power source 37. According to the present embodiment, a female connector 35 is provided at one side of the substrate 33 while a male connector 36 is provided at an upper side of the power source 37. Thus connection for supplying substantially high voltage to the substrate 33 is established, while noise and/or shorting which may be caused if direct connection were made via a cable or the like may be avoided.

Referring to FIGS. 4–7, the pair of optical visual units 40, 40 of the optical visual device 2 includes respective, box-shaped body units 41, 41, which are supported on the pair of shafts 39, 39 for allowing sliding movement thereof. Each body unit 41 includes rectangular, frame-like LCD holder 43 which is horizontally oriented and enabled to move in vertical directions via a vertically extending shaft 42. A diffusion plate 44 is mounted on an upper side of each of the LCD holders 43, and a transparent type LCD (liquid crystal display) panel 45 is mounted within each of the LCD holders 43. A squared cylindrical lens frame 46, mounts an ocular lens 47 at a rectangular opening portion at a rear side thereof (i.e. facing in the direction of the facing portion 12b of the rear cabinet, that is, facing the eyes of the user). One lens frame 46 being provided at a lower side of each of the LCD holders 43 respectively. A mirror (reflector plate) 48 is mounted at an angle of approximately 45° in a lower portion of each of the squared cylindrical lens frames 46 behind the ocular lens 47, and a coil spring 49 is provided on each side for constantly biasing each LCD holder 43 upwardly.

According to the above-described construction, when an image is displayed on the LCDs 45, 45, light emitted from the fluorescent lamp 34 of the backlight 30 is reflected as two parallel beams by the mirror surface 32 of the reflector 31 to irradiate the display portion 45a of each of the LCDs 45, 45 and the image is then projected via the reflection plates 48, 48 to the retinas of a user's left and right eyes A, A as an enlarged image via the ocular lenses 47, 47. Since the LCDs 45, 45 are illuminated by the same fluorescent lamp 34 differences in color, temperature and/or luminance between the LCDs 45, 45 can be eliminated and image quality is improved. It will be also be noted that, according to the above construction a stereo, or 3-D image wherein separate images are provided to the left and right eyes respectively, may also preferably be utilized.

Figure 6:
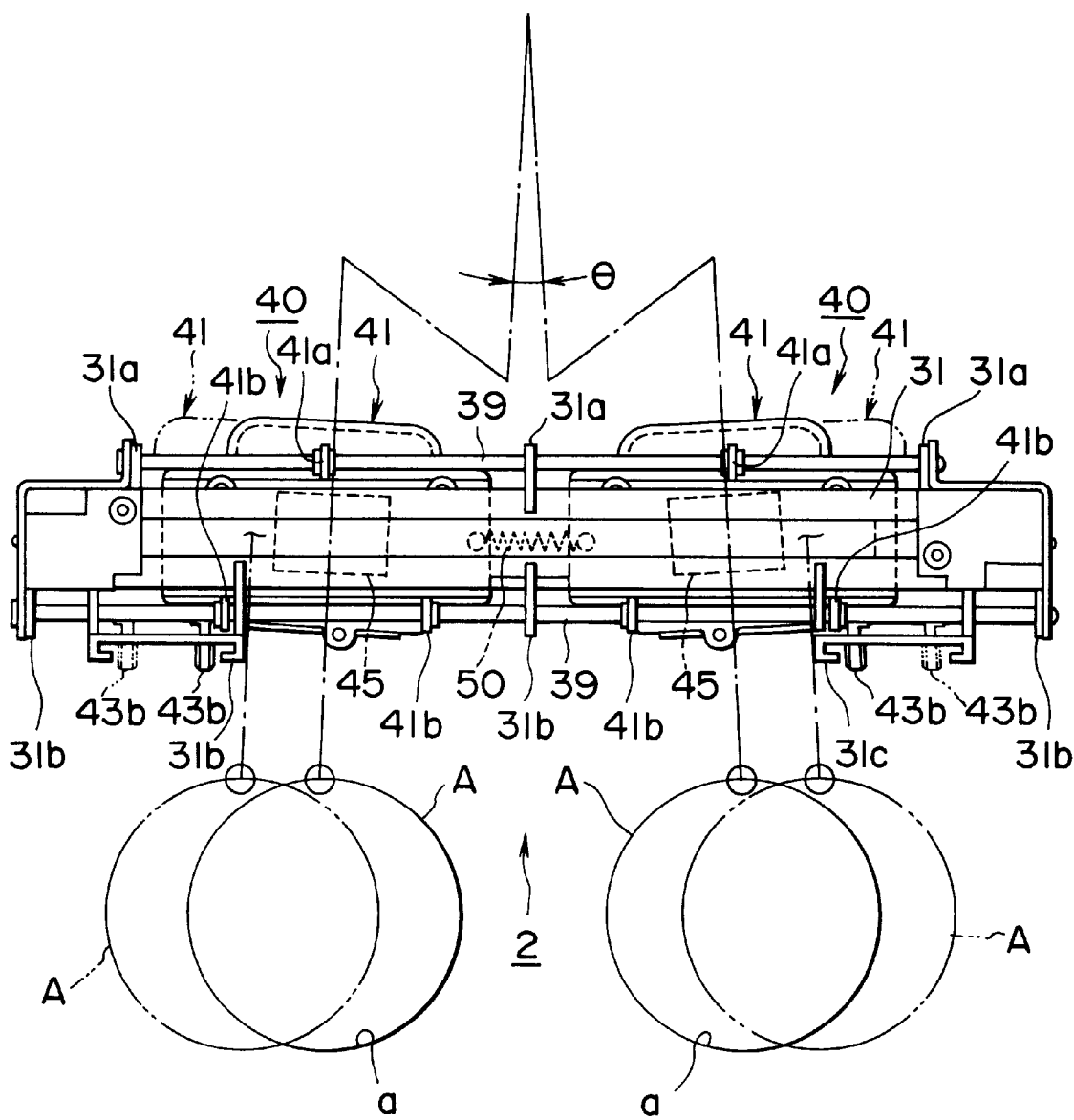
FIG. 6 is a plan view of the optical visual device of FIG. 4.

Referring now to FIG. 6, each of the unit bodies 41, 41 of the optical visual units 40, 40 are formed as a parallelepiped construction of, for example, synthetic resin. Projecting from, and integrally formed with, front and rear upper sides of the unit bodies 41, 41 holding portions 41a, 41b, 41b are respectively formed for engaging the shafts 39, 39. As seen in FIG. 6, the unit bodies are mounted so as to slant obliquely toward a center of the head-mounted image display apparatus 1. That is to say, on a horizontal plane, the rectangular shape of the unit bodies 41, 41, LCD holders 43, 43, LCDs 45, 45 etc. are displaced from a mutually parallel relationship, such that an outer side of the unit bodies sits further from the user than the inner sides. The degree of displacement, or tilting of the unit bodies is established at between 2° to 8° therebetween. The reason for this disposition of the unit bodies is so that a convergence angle of between 2 and 8 degrees exists between an image on the left LCD 45 and a corresponding, or identical image on the right LCD 45. This is to allow the user to easily merge the left and right images into a single image, while the user maintains a relaxed state since research has shown that in most humans, including infants a distance of between 40 mm to 75 mm exists between the pupils of the eyes and that, in a relaxed, or unfocused, state of the human eye, focal convergence occurs at a distance of between 60 cm and 1 m of the person. This corresponds to a slightly 'cross eyed' tendency of the human eye at rest which translates to a convergence angle of between 2.7° and 7.15° existing between the average pair of eyes. Thus, such an convergence has been considered by the present inventors and a displacement of between 2° and 8° has been provided between the unit bodies 41, 41. According to this, eye fatigue as well as mental fatigue associated with eyestrain may be minimized so that the head-mounted image display apparatus 1 may be used for long periods of time Also, the head-mounted image display apparatus 1 according to the invention becomes comfortable to wear and may be easily adapted to be worn by a large number of unspecified users.

Figure 32:
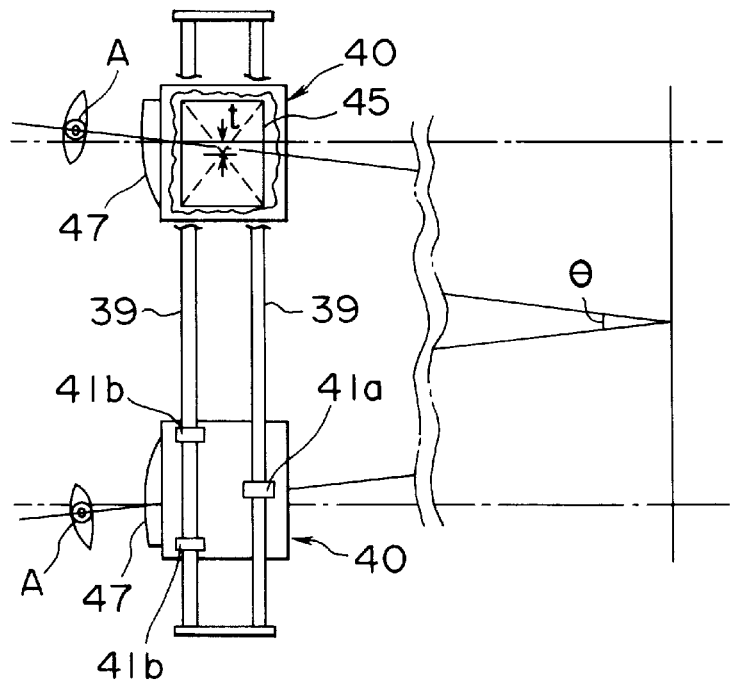
FIG. 32 is an explanatory diagram of a convergence angle establishing means according to an alternative embodiment of a head-mounted image display apparatus of the invention.

In addition, although according to the present embodiment the optical visual units are tilted at the above-mentioned convergence angle relative to the pair of shafts 39, 39 along which they move, as seen in FIG. 32, it is also possible to set the convergence angle by offsetting or tilting the mounting of the LCDs 45, 45 from a light axis in a magnitude t toward the center of the shafts 39, 39 without tilting each of the entire optical visual units 40, 40 relative the shafts 39, 39.

Figure 8:
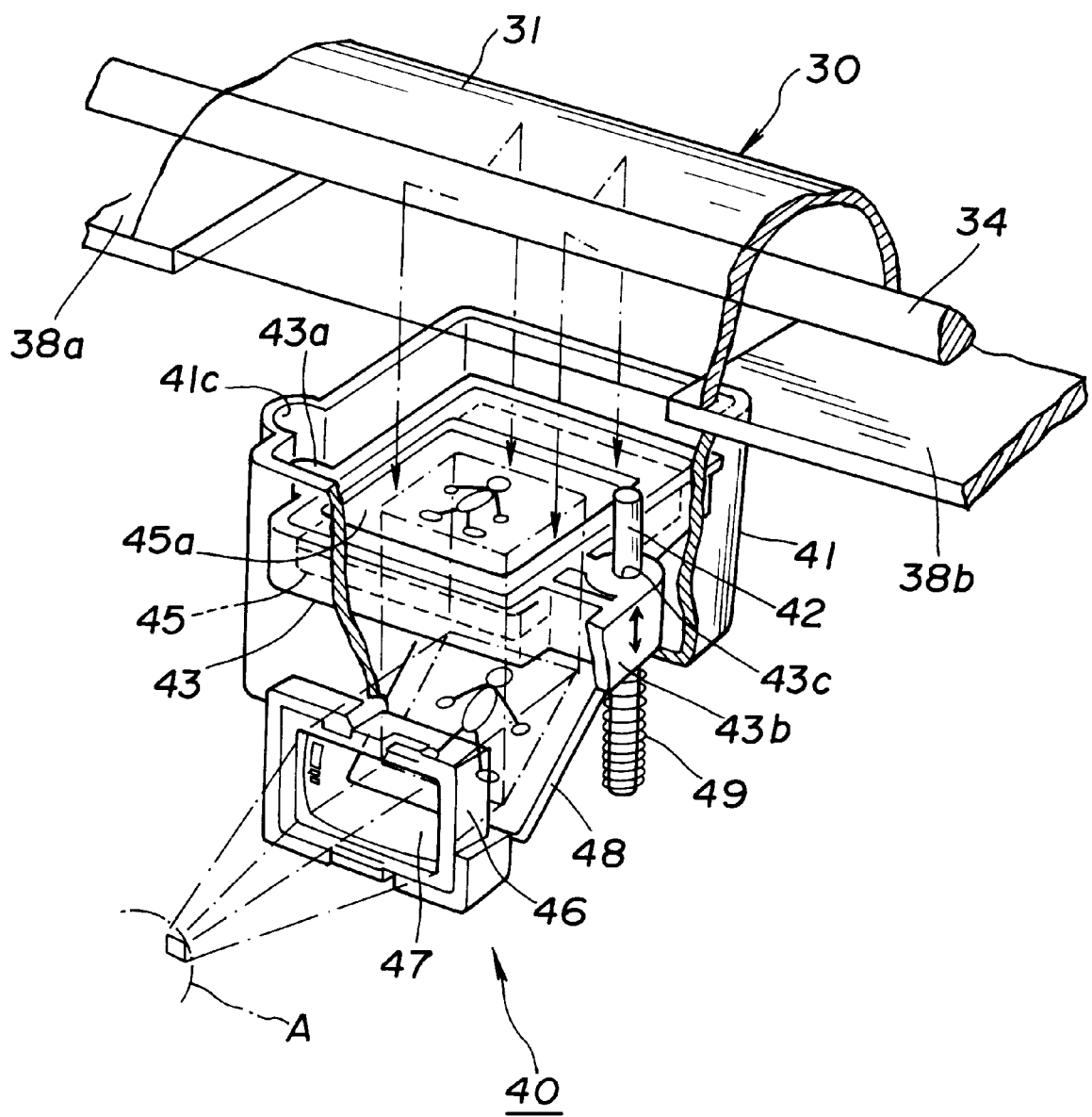
FIG. 8 shows a partially cut away perspective view of an optical visual unit provided in the optical visual device.

Also, referring again to FIG. 6, a coil spring 50 is disposed between the pair of unit bodies 41, 41 and engages facing sides thereof so as to bias the unit bodies 41, 41 toward each other along the shafts 39, 39. Furthermore, as shown in FIG. 8, the facing sides of each of the unit bodies 41 are respectively provided with a reverse U-shaped, vertical sliding groove 41c formed integrally therein. The vertical sliding groove 41c receives therein a reverse U-shaped projecting portion 43a of the LCD holder 43 for stably enabling vertical movement of the LCD holder 43 and preventing movement of the LCD holder 43 around the shaft 42.

Still referring to FIG. 8, is may be seen that, provided on the LCD holder 43 on a side opposite that having the reverse U-shaped projecting portion 43a, an L-shaped projecting portion 43b is integrally formed. The L-shaped projecting portion 43b has a vertically oriented circular opening 43c defined therethrough by which the LCD holder 43 engages the vertical shaft 42.

Figure 4:
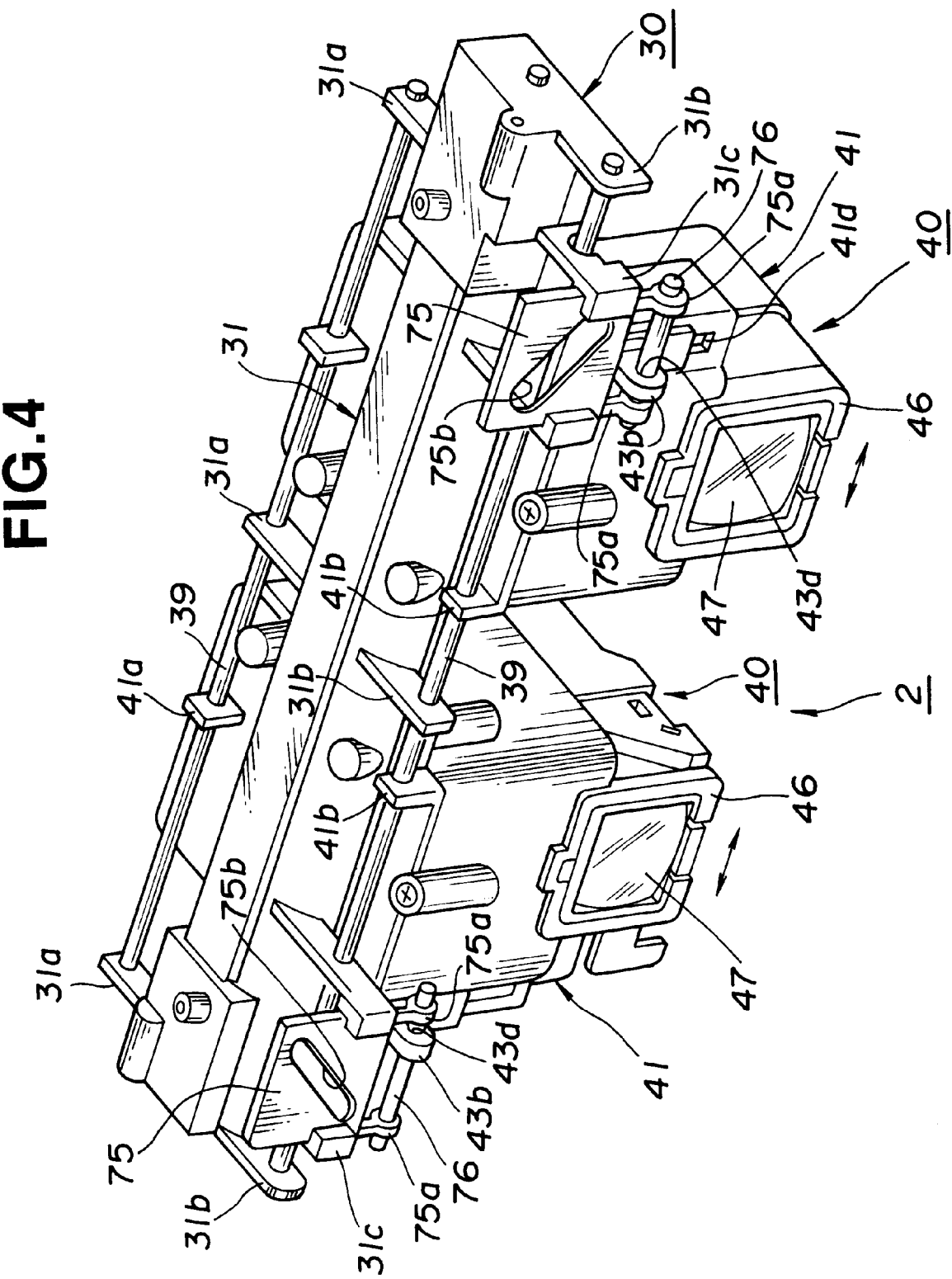
FIG. 4 is a perspective view of an optical visual device employed in the head-mounted image display apparatus.

On the other hand, as best seen in FIG. 4, at a projecting end of the L-shape of the projecting portion 43b, a laterally oriented opening 43d is defined. The L-shaped projecting portion 43b projects through a groove 41d formed in the rear side of each unit body 41 and the laterally oriented opening 43d therethrough engages a shaft 76 of a focus adjusting means 70, as will be explained in more detail hereinlater.

It should additionally be noted that, as seen in FIG. 5, a substrate 51, a flexible substrate 52 are provided at rear and bottom sides of the optical visual units 40, 40, and a system (control) substrate 53 is provided at a top side of the optical visual units 40, 40, mounted on the reflector 31.

The pair of optical visual units 40, 40 are horizontally movable toward and away from each other via eye distance adjusting mechanisms 60, 60 provided on the lower shelf portion 12c of the rear cabinet 12 as will be explained in detail with reference to FIGS. 13 and 14.

Figure 13:
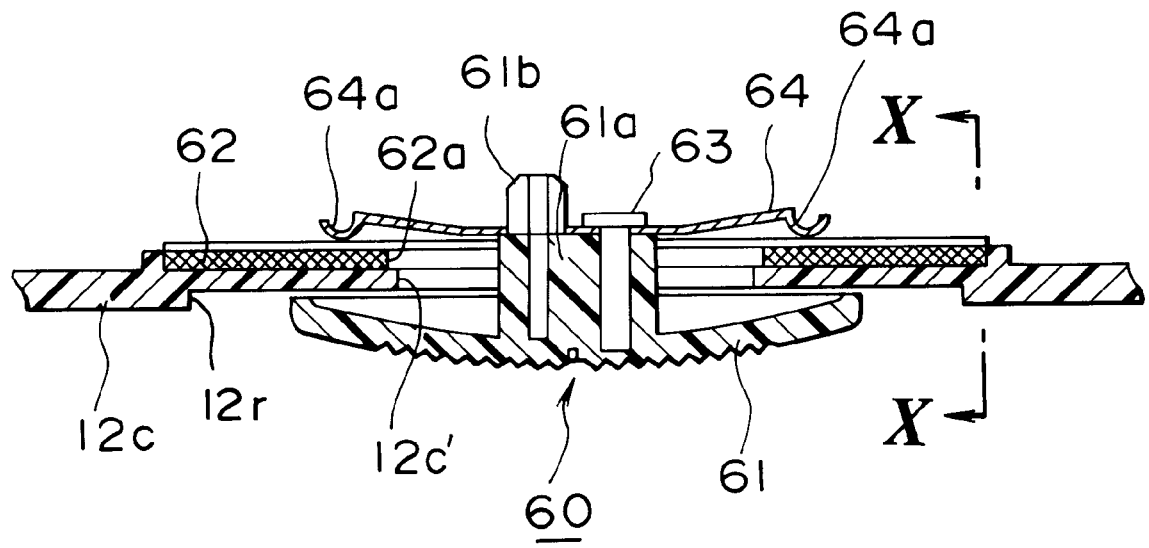
FIG. 13 is a cross-sectional view of an eye distance adjusting mechanism according to the invention.
Figure 14:
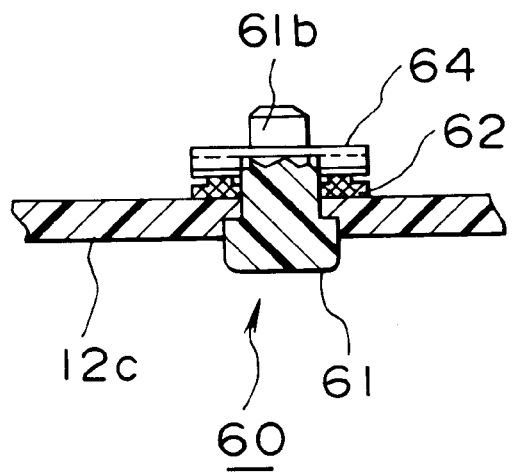
FIG. 14 is a lateral cross-sectional view of the eye distance adjusting mechanism of FIG. 13.

As seen the FIG. 13, each eye distance adjusting mechanism 60 comprises an adjusting knob 61 which projects from the bottom side of the lower shelf portion 12c of the rear cabinet 12 via an elongate opening 12c' provided through the shelf portion 12c. The adjusting knob 61 is horizontally slidable in left and right directions.

As shown in FIG. 13, the eye distance adjusting mechanism 60 comprises an eye distance adjusting slider 61 projected through a groove 12c' formed in a recessed portion 12r of the shelf portion 12c of the rear cabinet 12. A leaf spring 64 is retained to a rear side of the eye distance adjusting knob 61 via a fastening pin 63, which may for example be a rivet, screw or other suitable retaining means, and a backing plate 62 is interposed between a top surface of the shelf portion 12c and the leaf spring 64 held by the fastening pin 63. As seen in the drawing, the leaf spring 64 is fastened to the rear side of the eye distance adjusting slider 61. such that downwardly curved distal ends 64a thereof are biased to apply downward pressure against the backing plate 62 so as to seat the slider firmly in the groove 12c'. It will be noted that the backing plate 62 has a groove 62a formed therethrough corresponding to the groove 12c' such that the eye distance adjusting slider 61 is smoothly slidable horizontally in left and right directions along the groove 12c'.

Figure 7:
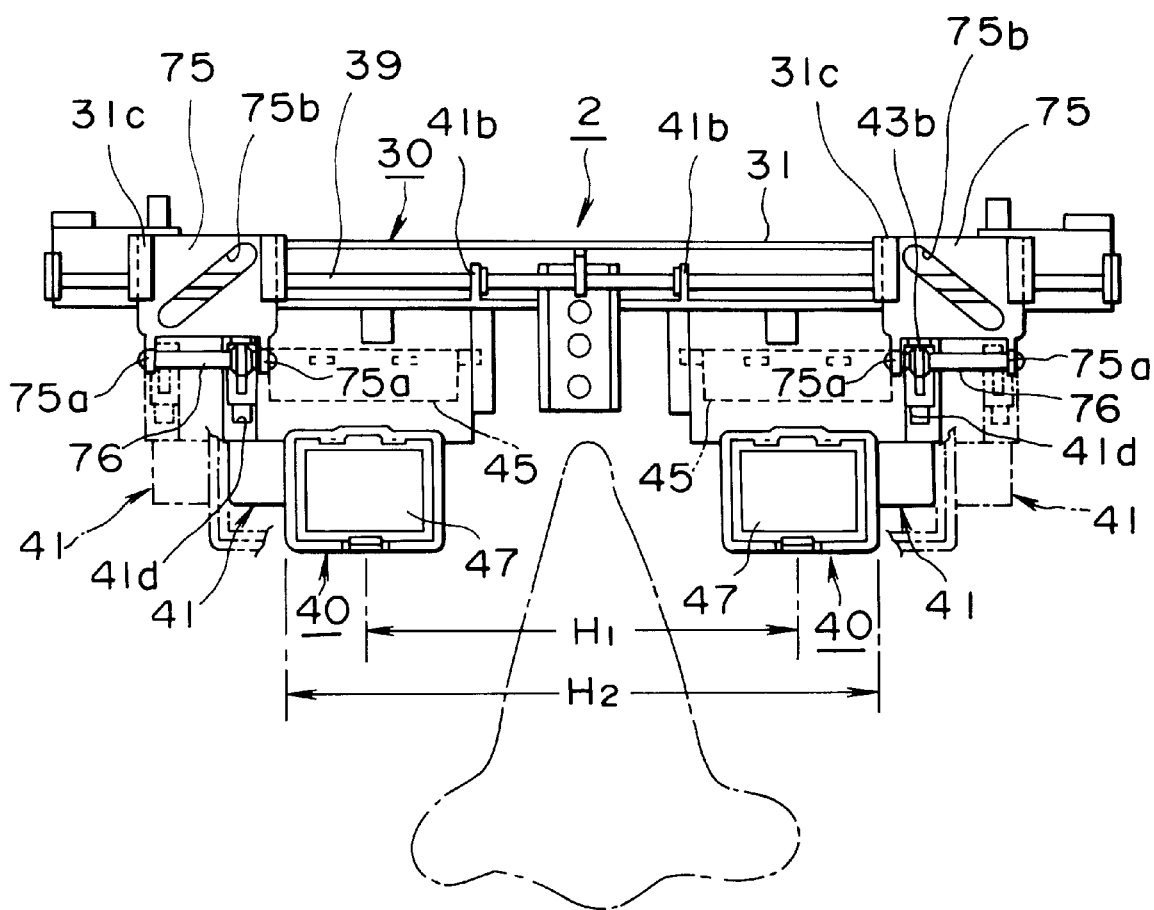
FIG. 7 is a rear view of the optical visual device of FIG. 4.
Figure 10A:
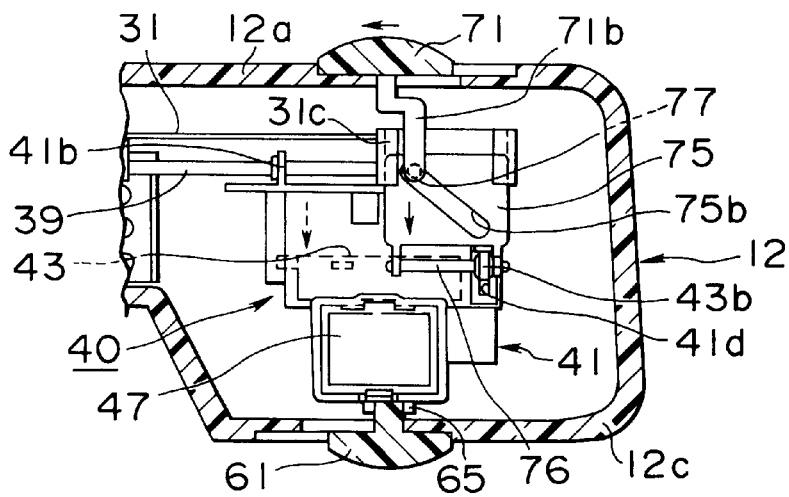
FIGS. 10a–10c are partial front views of the head-mounted image display apparatus for showing a positional condition of focus and eye distance adjusting mechanisms according to movement of adjustment sliders associated therewith.

A rear, or upper side 61b of the eye distance adjusting slider 61 is formed to as to be engageable with a stopper member 65, as best seen in FIG. 10a. Referring now to FIG. 7, according to the above described construction, the eye distance adjusting slider is effective to slide the optical visual units 40, 40 between a first smaller distance H1, and a second longer distance H2 such that the optical visual units 40, 40 may be freely movable according to a user's preferences. According to the present embodiment, the distance H1 is set at 55 mm while second distance H2 is set to 75 mm, though other dimensions may also be preferably employed.

Figure 11:
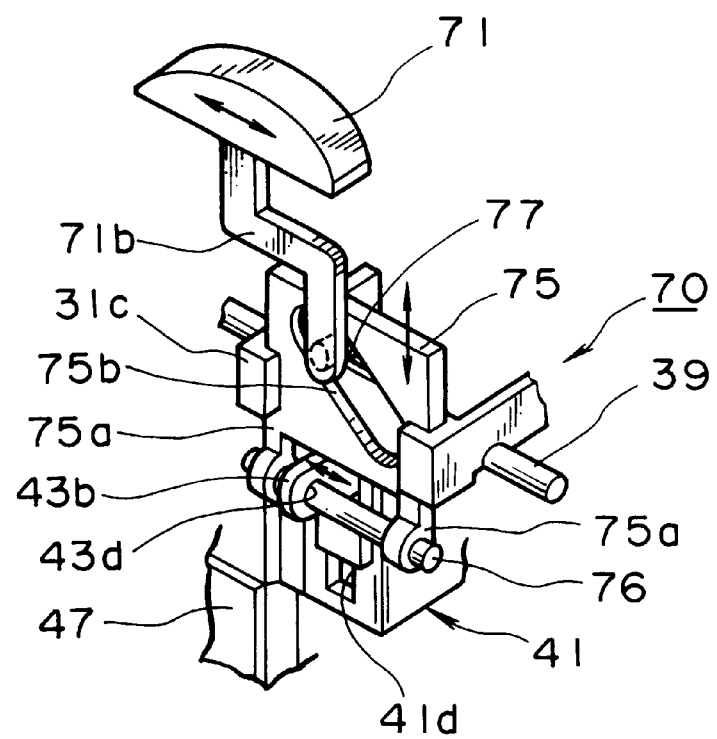
FIG. 11 is a perspective view of a focus adjusting mechanism according to the invention.
Figure 12:
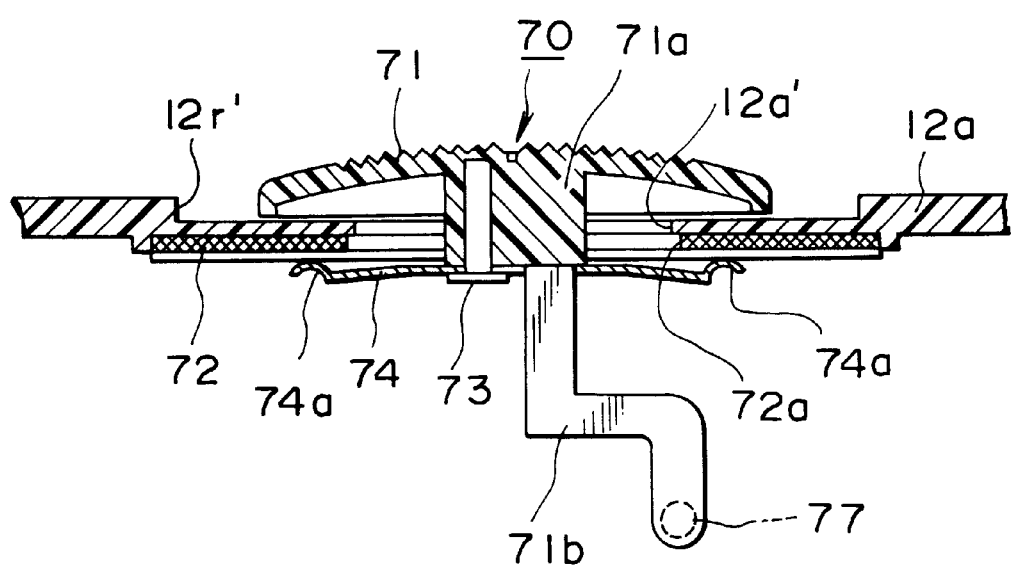
FIG. 12 is a cross-sectional view of a slider portion of the focus adjusting mechanism of FIG. 11.

Hereinbelow, the structure of a pair focus adjusting mechanism 70, 70 acting on the optical visual units 40, 40 will be described hereinbelow with reference to FIGS. 11 and 12.

Figure 30:
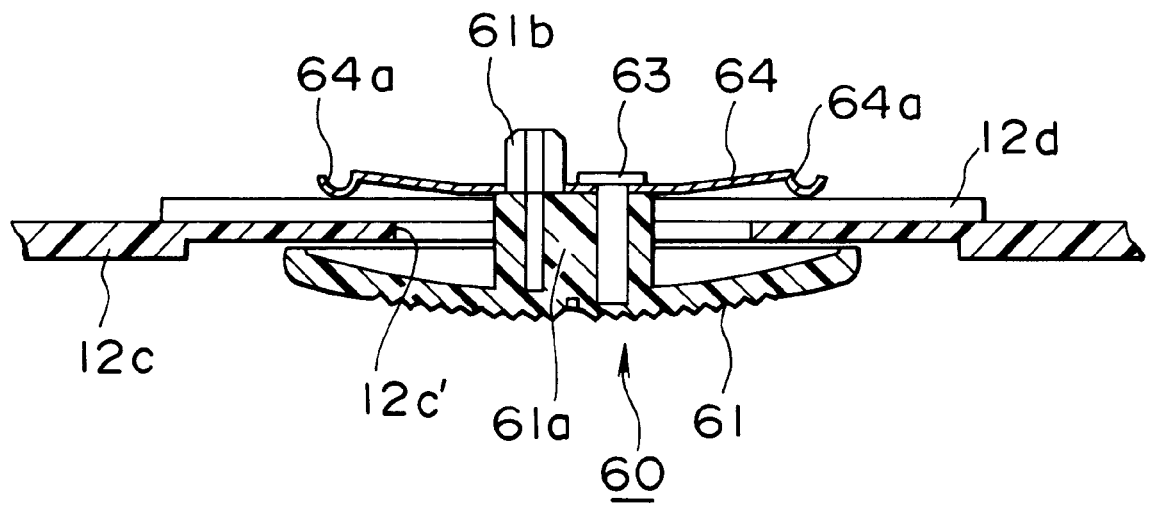
FIG. 30 is a cross-sectional view of an alternative construction of an adjustment slider according to the invention.
Figure 31:
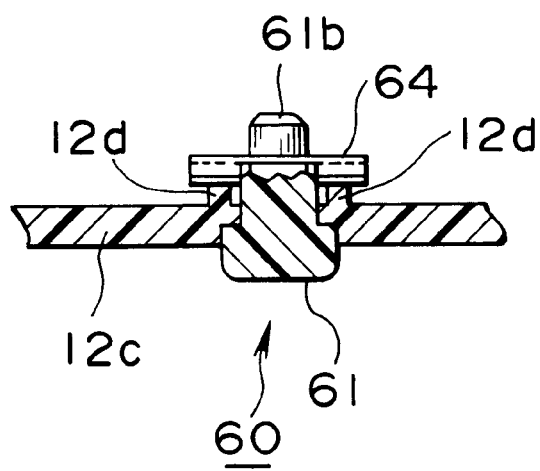
FIG. 31 is a lateral cross-sectional view of the alternative adjustment slider construction of FIG. 30.

The focus adjusting mechanisms 70, 70 are provided at each side of the upper visor portion 12a or the rear cabinet and are active to move the optical visual units 40, 40 up and down vertically. Similarly to the eye distance adjusting mechanisms 60, 60 and as seen in FIG. 11, each focus adjusting mechanism 70 comprises a focus adjusting slider 71 projected through a groove 12a' and horizontally slidable in left and right directions along the groove 12a', which is formed in a recessed portion 12r' of the visor portion 12a of the rear cabinet 12. A leaf spring 74 is retained to a rear side of the eye focus adjusting slider 71 via a fastening pin 73 and a backing plate 72 is interposed between a bottom surface of the visor portion 12a and the leaf spring 74 held by the fastening pin 73. As seen in the drawing, the leaf spring 74 is fastened to the rear side of the focus adjusting slider 71 such that upwardly curved distal ends 74a thereof are biased to apply upward pressure against the backing plate 72 so as to seat the slider firmly in the groove 12a'. It will be noted that the backing plate 72 has a groove 72a formed therethrough corresponding to the groove 12a' such that the focus adjusting slider 71 is smoothly slidable horizontally in left and right directions along the groove 12a'. Further, the backing plates 72 and/or 62 of the eye distance adjusting mechanisms 60, 60 may be formed of a self lubricating material such as oil impregnated synthetic resin or the like for promoting smooth movement of the eye distance adjusting sliders 61, 61 and/or the focus adjusting sliders 71, 71. Since both the eye distance adjusting sliders 61, 61 and the focus adjusting sliders 71, 71 are biased toward the outside of the head-mounted image display apparatus 1 by leaf springs 64, 74 having curved distal end portions 64a, 64a, 74a, 74a, sufficient frictional force is applied that smooth sliding may be obtained without oversliding, thus making fine positional adjustments easily possible. It will be noted that, instead of backing plates 62, 72 for the eye distance adjusting sliders 61, 61 and/or the focus adjusting sliders 71, 71, self lubricating rib portions may be integrally formed on the visor and/or shelf portions 12a, 12c of the rear cabinet of oil impregnated plastic or the like as shown in FIGS. 30 and 31 as rib portions 12d.

A rear, or lower arm portion 71b of the focus adjusting slider 71 is formed with an pin 77 on the end thereof. The arm portion 71b is L-shaped, with a downwardly extending section formed at the distal end of the 'L', the end of the downwardly extending section having the pin 77 formed thereon. The pin 77 acts as a cam follower such that, as seen in FIG. 11, when the focus adjusting slider 71 is slid in left or right directions along the groove 12a', the pin 77 moves along an obliquely angled cam groove 75b formed in a vertical slide plate 75. As seen in FIG. 11, the side plate is disposed substantially parallel to the face portion 12b of the rear cabinet and is slidably supported between a pair of brackets 31c, 31c associated with the reflector 31. A lower side of the slide plate 75 has support members 75a, 75a extending downwardly therefrom at opposing lower corners thereof and supporting a lateral shaft 76 therebetween. The lateral shaft 76 is fitted through the lateral opening 43d of the projecting portion 43a of the LCD holder of each the optical visual units 40, 40 respectively.

Figure 10B:
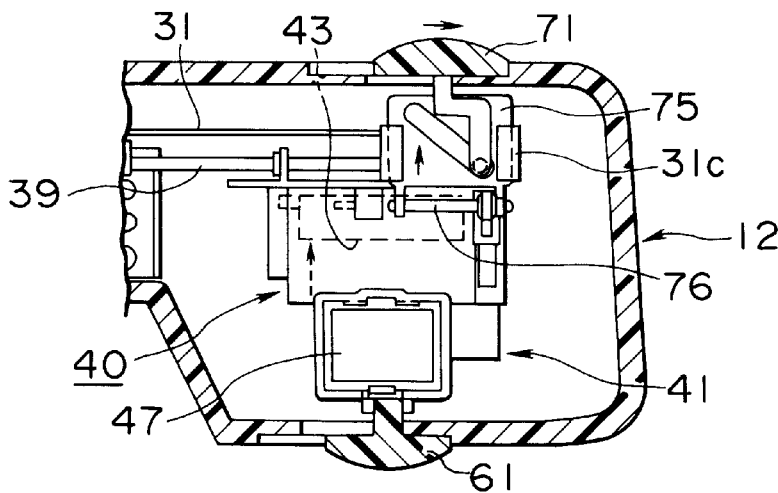
Figure 10C:
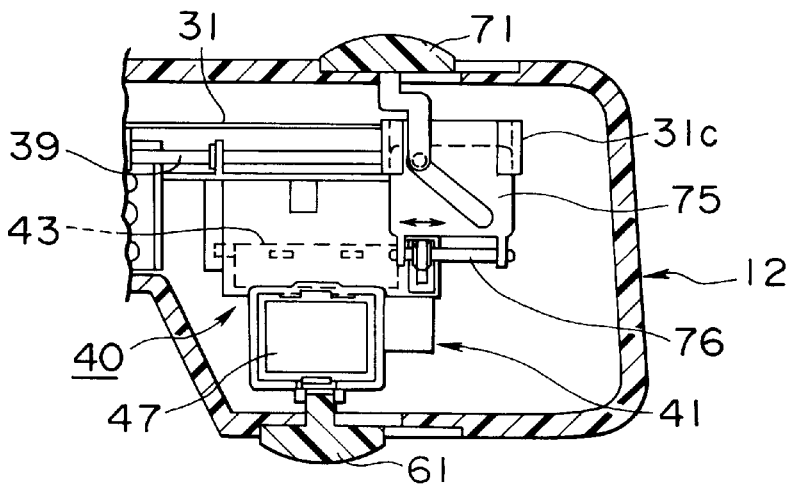

Thus, as seen in FIGS. 10a–10c when sliding movement of the focus adjusting slider 71 is performed, the pin 77 slides along the oblique cam opening 75a while the lateral shaft slides in the lateral opening 43d of the LCD holder. According to this, the LCD holder slides in up or down in the vertical direction along the vertical groove 41d formed in each of the unit bodies 41, 41, while the lateral spacing of the optical visual units 40, 40 as set by the eye position adjustment mechanisms 60, 60 is maintained. According to the vertical movement of the LCD holder 43, a spacing between the LCD 45, the reflector plate 48 and the ocular lens 47 is changed for allowing a user to focus an image present on the LCD according to preference.

It will be noted that, according to the above described construction, focusing and lateral positioning of each of the optical visual units 40 on left and right sides of the head-mounted image display apparatus 1 may be separately established. Also, if eye distance adjustment is effected after focusing, a focused vertical position of the LCDs 45 will not be disturbed. For further facilitating optimal focusing of the LCDs 45, 45, FIG. 2 shows a pair of calibration switches 55L, 55R which are provided on an upper side of the visor portion 12a. The calibration switches are connected to the system substrate 53 for operating the LCDs 45, 45 as follows: when the left side calibration switch 55L is depressed, the system is operable to black out the right side LCD 45 and to display a test pattern on the left display for allowing a user to establish optimal focusing for the left eye. On the other hand, when the right side calibration switch 55R is depressed, the system is operable to black out the left side LCD 45 and to display a test pattern on the right display for allowing a user to establish optimal focusing for the right eye. Thus, individual focus may be established for each eye while both eyes remain open.

According to the above described structure of a head-mounted image display apparatus 1 according to the invention, since the shielding plates 38a, 38b are mounted on the mirror surface 32 side of the reflector 31, external leakage of light from the fluorescent lamp 34 is prevented. Also, efficiency of irradiation of the LCDs by the fluorescent lamp 34 is improved.

According the above-described structure of the optical visual units 40, 40 including the eye distance adjusting mechanisms 60, 60 and the focus adjusting means 70, 70, the ocular lenses 47, 47 are vertically fixed at a set distance from the eyes A, A of the user. The reflection plates 48, 48 are fixed obliquely to the ocular lenses 47, 47 and the LCDs 45, 45 while the LCDs 45, 45 are vertically movable within the LCD holders 43, 43 the image displayed on the LCDs 45, 45 may be projected on the retinas a, a of the eyes A, A with vertical deflection, facilitating precise focus adjustment with a simple structure. According to this, the ocular lenses 47, 47 may be positioned as close as possible to the eyes A, A for ease of viewing and, for creating a feeling of immediacy, or immersion in the viewed image. Also, close positioning of the ocular lenses 47, 47 relative the eyes A, A allows a smaller diameter of ocular lens to be utilized for further downsizing of the head-mounted image display apparatus 1.

Figure 33A:
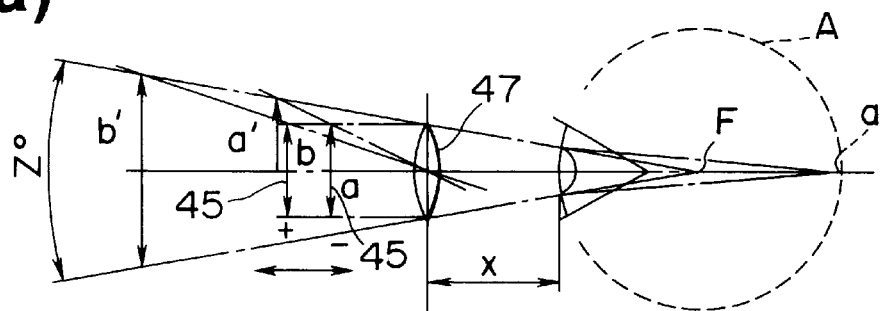
FIG. 33a is an explanatory diagram of optical characteristics of the head-mounted image display apparatus of the invention.
Figure 33B:
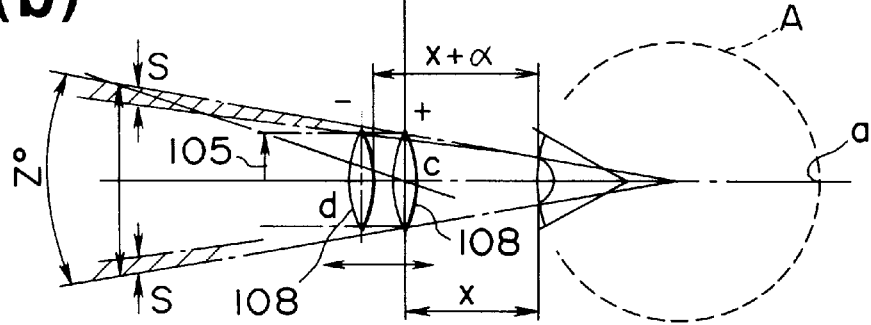
FIG. 33b is an explanatory diagram of optical characteristics of a conventional head-mounted image display apparatus.
Figure 34:
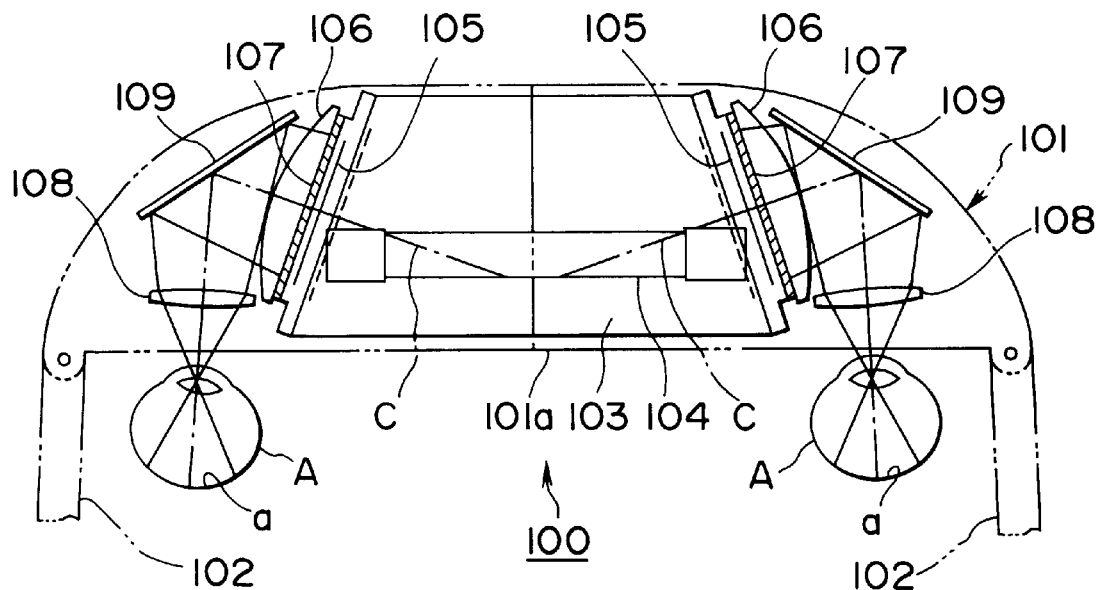
FIG. 34 is an explanatory diagram of image reflection in a conventional head-mounted image display apparatus.
Figure 35:
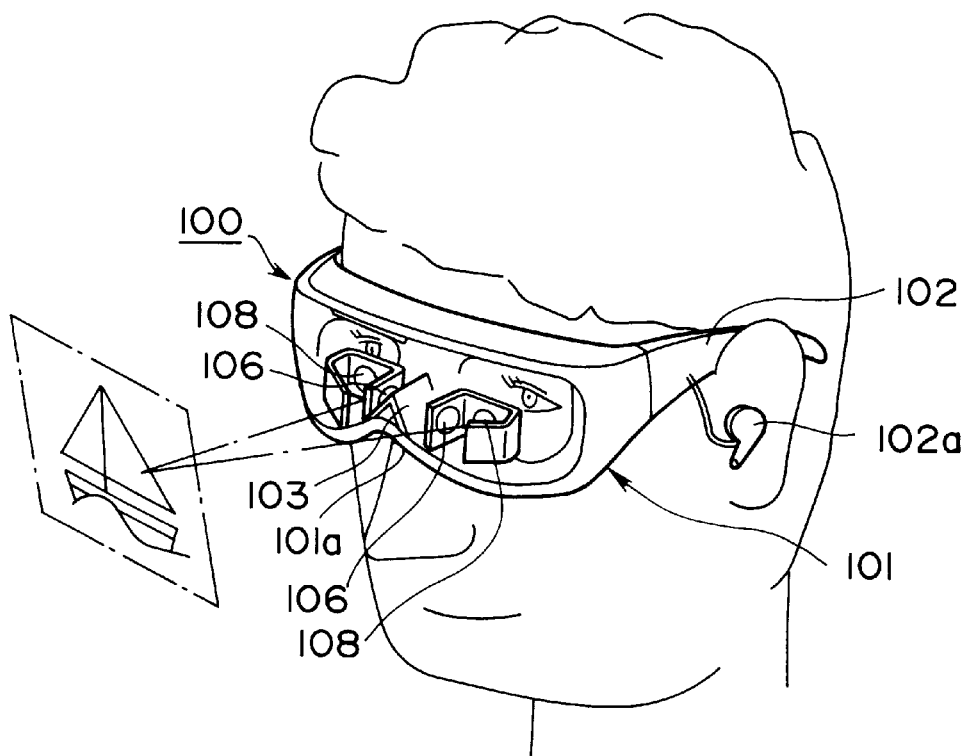
FIG. 35 is a perspective view of a conventional head-mounted image display apparatus such as shown in FIG. 34.

Referring to FIGS. 33a and 33b, as set forth, by making each color liquid crystal display panel 45 movable in each unit body 41 while each ocular lens 47 is positionally fixed to the rear portion of each unit body via the lens mirror cylinder 46, it becomes possible to make the distance between each ocular lens 47 and the pupil of the eye A constant without varying the distance between the ocular lens 47 and the eye A so that an image can be stably viewed commonly with a virtual image. That is, referring to FIG. 33a, when fine focus adjustment is carried out by moving an LCD 45 vertically from a position a to a position b, the distance between the ocular lens 47 and the eye A can be held unchanged at X and the virtual images may be formed at positions a' and b' corresponding to the positions a and b. Since this virtual image changes the position always within a set image angle Z° the complete image may always be adequately seen by the user. Conversely, as seen in FIG. 33b in a conventional type head-mounted image display apparatus 100 wherein focus adjustment is effected by moving the ocular lens 108, the distance X between the ocular lens 108 and the eye A is varied so that an image angle Z° is also caused to vary. According to this, image 'dropout' may occur in the shaded areas S of the conventional arrangement. According to the present invention, such dropout is surely prevented.

Also according to the invention, the LCDs 45, 45 may be of a transmission type thin plate form and since the reflector 31 is adapted to also act as a frame, further size reduction of the head-mounted image display apparatus 1 is possible.

Now, with reference to FIGS. 15–22 the earphone cup receptacle mechanisms 80, 80 of the invention will be described hereinbelow.

Figure 15:
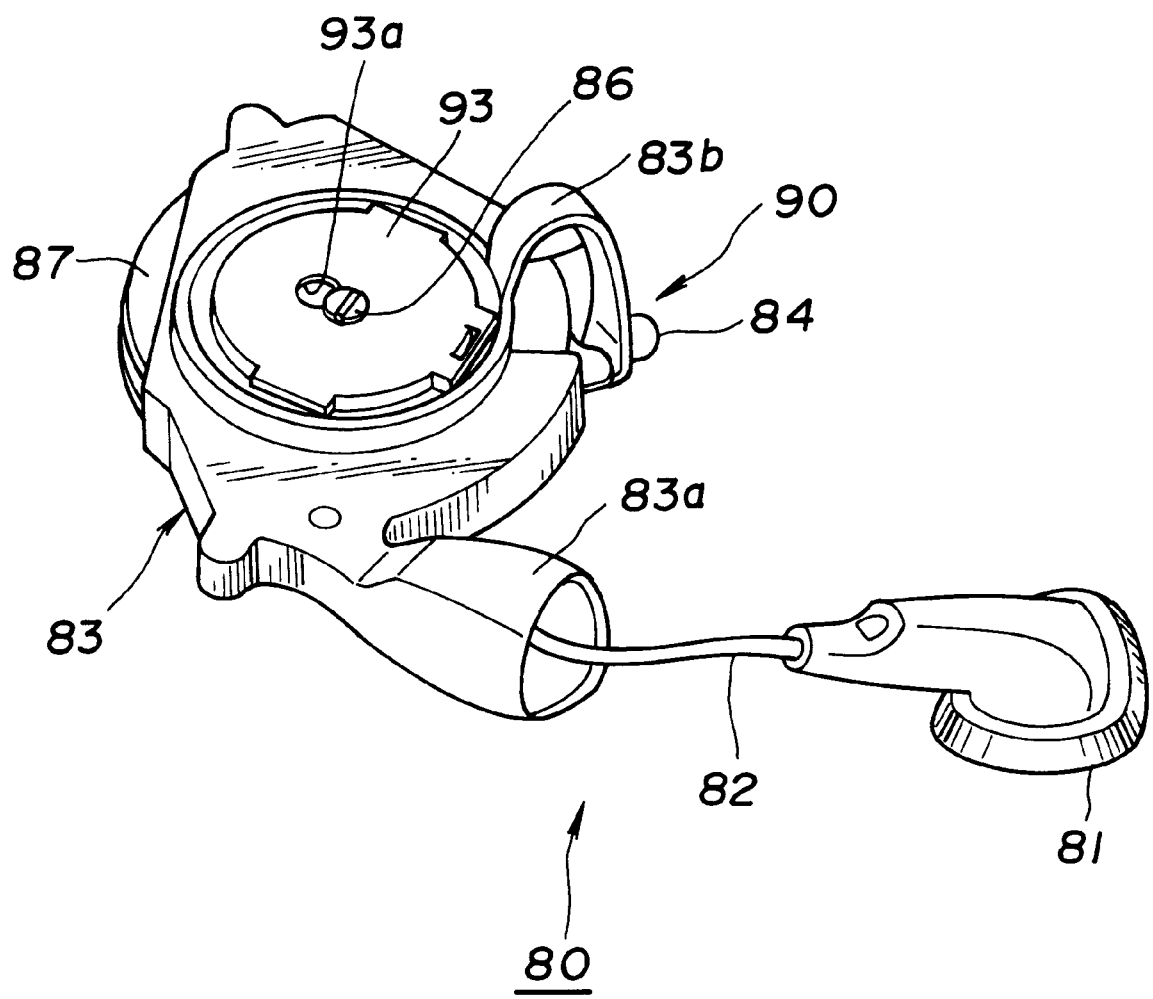
FIG. 15 is a perspective view of an earphone cup receptacle mechanism according to the invention.
Figure 16:
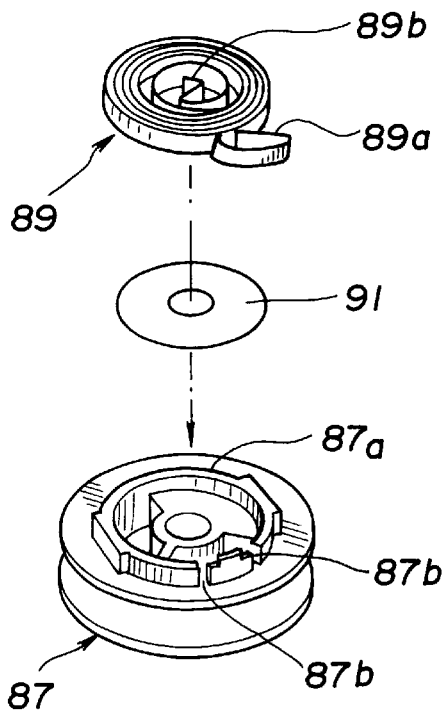
FIG. 16 is an exploded perspective view of a reel portion of the earphone cup receptacle mechanism of FIG. 15.
Figure 20:
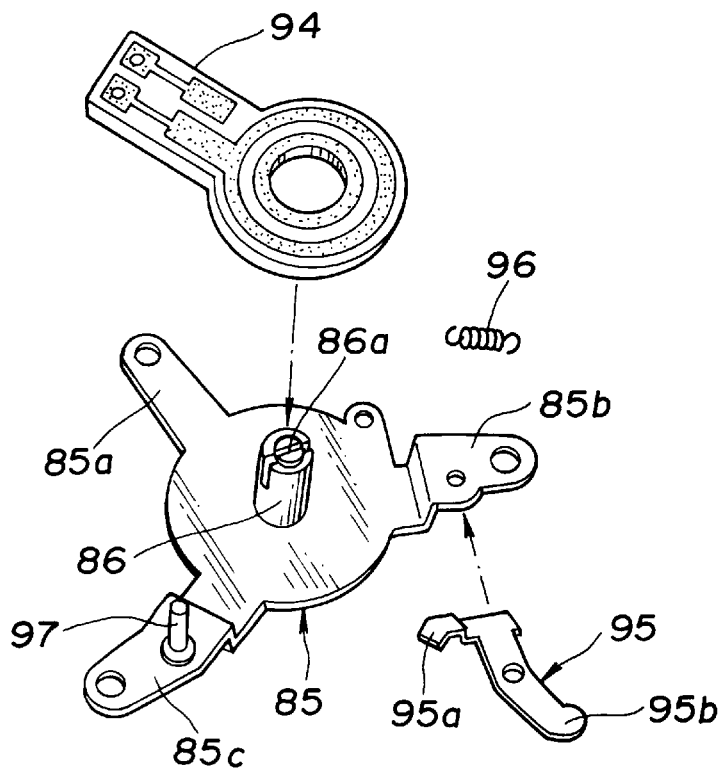
FIG. 20 is an exploded perspective view of a top side of a mounting plate portion of the earphone cup receptacle mechanism.

Referring now to FIG. 15, each earphone cup receptacle mechanism 80 generally comprises a receptacle casing 83 for receiving an earphone cup 81 and a cord 82 connected thereto. A reel 87 is rotatably supported in the casing 83 via a mounting plate 85 (FIG. 20). As seen in FIG. 16, a power spring 89 is provided within the reel 87 for biasing the reel 87 in the winding direction. Also, cord length adjusting means 90 is provided for adjusting a retracting length of the cord 82.

Figure 17:
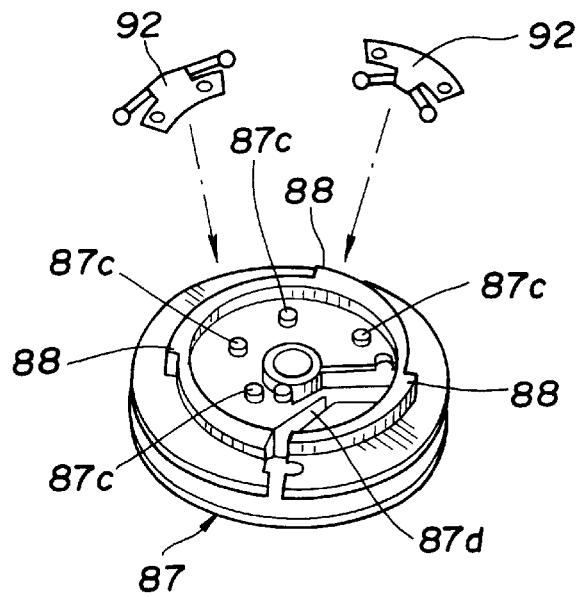
FIG. 17 is a perspective view of a rear side of the reel portion of FIG. 16.
Figure 18:
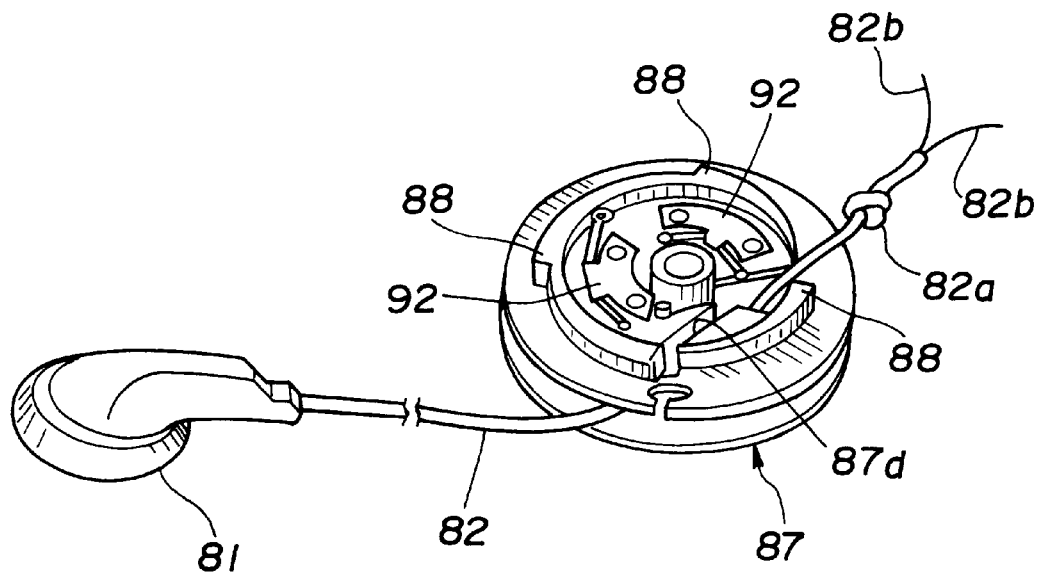
FIG. 18 is a perspective view showing a retracted condition of a cord connecting an earphone cup.
Figure 19:
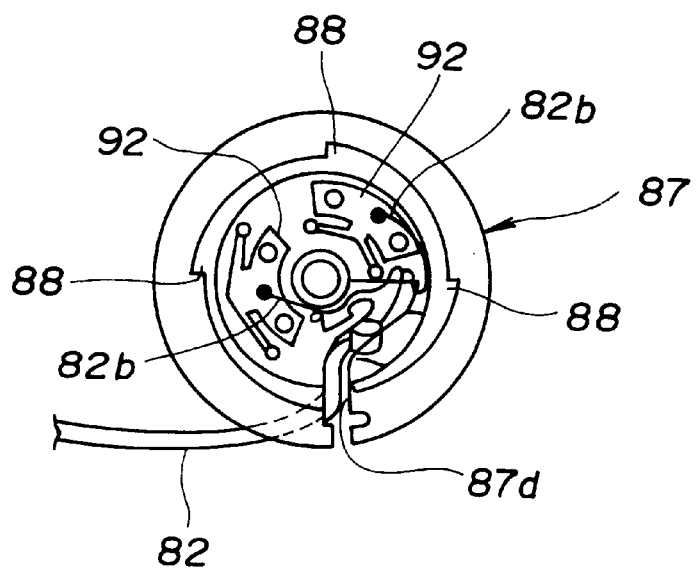
FIG. 19 is a plan view showing a condition in which a cord attached to an earphone cup is retracted.

Still referring to FIG. 16, it may be seen that the reel 87 has an annular rib 87a formed on a top side thereof. The power spring 89 is pressed into a space defined within the annular rib 87a with a spacer 91 interposed between the top surface of the reel 87 and the power spring 89. One end of the power spring 89 is engaged with a pair of cut-outs 87b, 87b of the annular rib 87a and, as shown in FIG. 17, four bosses 87c, 87c, 87c, 87c are projected from the top side of the reel 87, one pair of bosses 87c being used to support one of a pair of contact terminals 92, 92, respectively. The contact terminals may be partially embedded in the top surface of the reel or attached by ultrasonic welding, etc. In addition, three ratchet portions 88, 88, 88 are formed at outer sides of the annular rib 87a spaced along the outer circumference thereof. Slits 87d formed within the space defined by the annular rib 87a and positioned in relation to the ratchet portions 88, 88, 88 allow an knotted end portion 82a of the cord 82 to pass from the inner hub of the reel 87 to the outer side thereof, as seen in FIG. 18. At the end of the cord 82, projecting beyond the knotted end portion 82a, conducting wires 82b, 82b are projected. These conducting wires 82b, 82b, are respectively soldered to one of the contact terminals 92, which are connected so as to receive an input audio signal which may accompany an image signal input from a VTR (not shown) or the like via the connecting cord 26, for example. The cord may be attached to the reel by the knotted end 82a and workability may be improved while a manufacturing process may be simplified.

Figure 21:
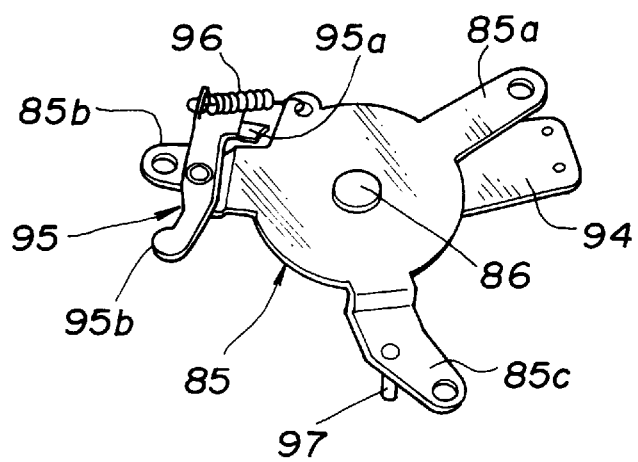
FIG. 21 is a perspective view of a bottom side of the mounting plate portion of FIG. 20.

Referring to FIG. 20, each reel 87 is supported on a shaft 86 secured to a substantially center portion of the mounting plate 85 and covered by a holding plate 93 (best seen in FIG. 15). As seen in FIGS. 20 and 21, the mounting plate 85 has three integrally formed projecting portions 85a, 85b, 85c. On the top side of the first projecting portion 85a, a terminal substrate 94 is attached via a bonding layer (not shown), or the like. On the bottom side of the second projecting portion 85b, a rocking arm 95 is pivotally mounted, via a pin or the like. The rocking arm 95 has a tip end 95a biased by a tension coil spring 96 so as to engage with the ratchet portions 88, 88, 88 of the annular rib 87a according to rotation of the reel 87. An upper side of the third projecting portion 85c mounts a shaft 97 for supporting a pulley 98 (FIG. 22) for guiding the cord 82.

Figure 22:
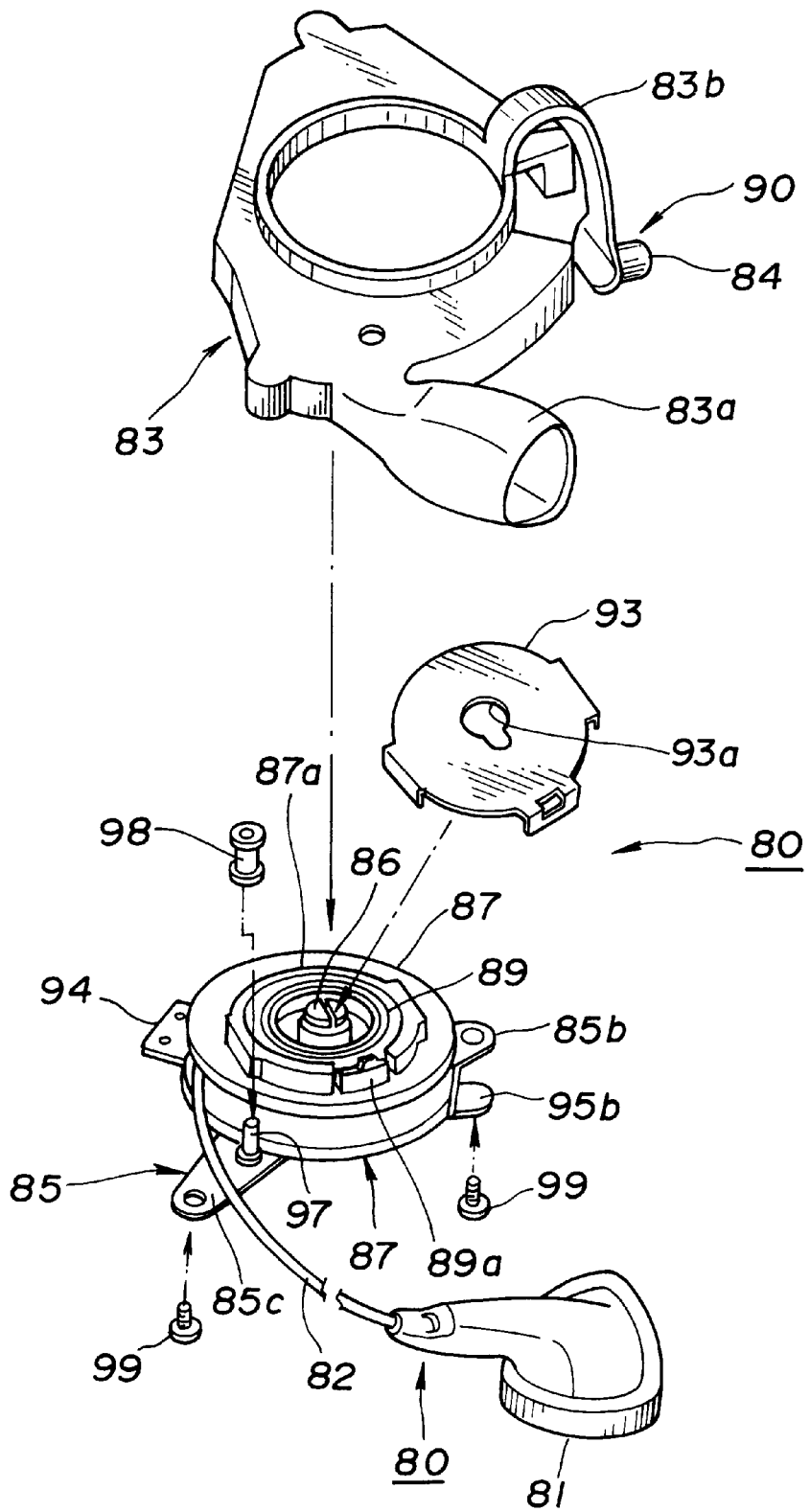
FIG. 22 is an exploded perspective view of are earphone cup receptacle mechanism according to the invention.
Figure 23:
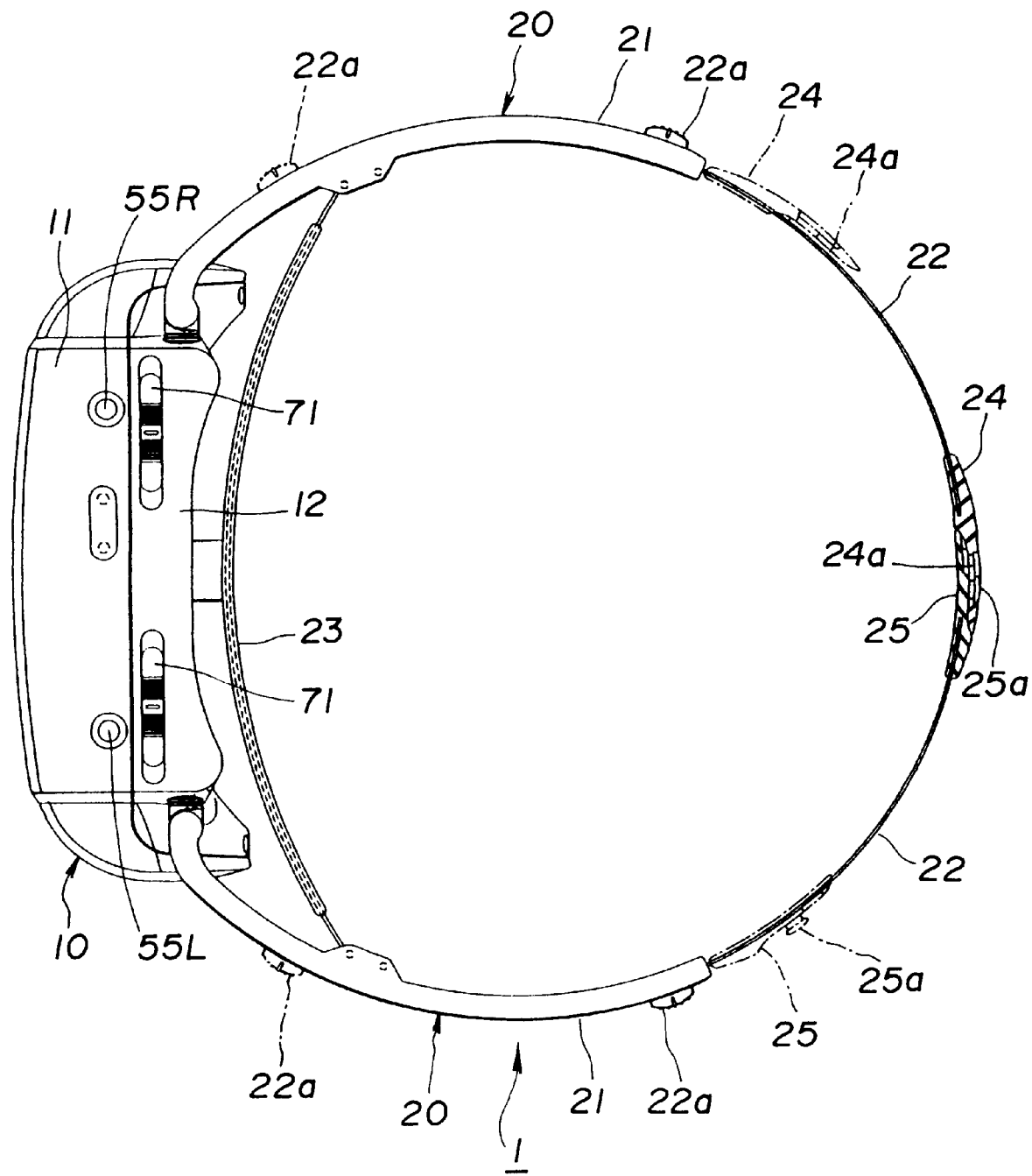
FIG. 23 is a plan view of the head-mounted image display apparatus of the invention.
Figure 24:
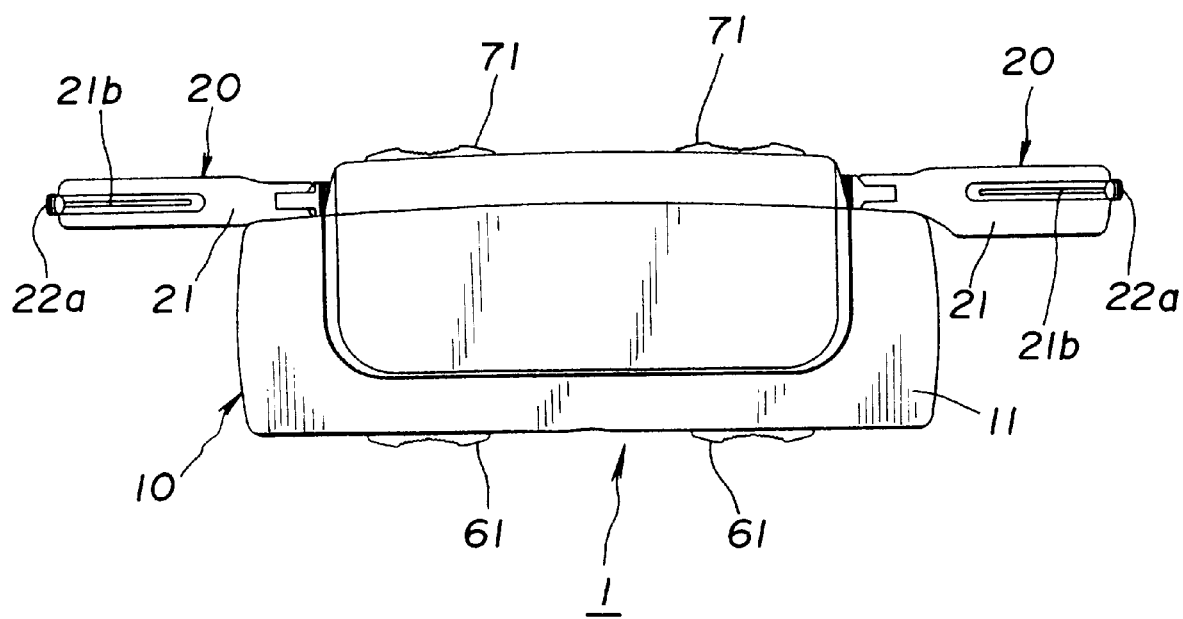
FIG. 24 is a front elevation of the headmounted image display apparatus of the invention.

Referring now to FIG. 22, a slit 86a is formed at the top of the shaft 86 mounting the reel 87. The other end of the power spring 89 is engaged with the slit 86a and the holding plate is set over the assembled mechanism via a gourd-shaped engaging hole which engages the top of the shaft 86. The power spring is given a predetermined number of turns before installation of the earphone cup 81 and the cord 82 to provide an initial torque as biasing force for the reel 87. The receptacle casing 83 is set over the holding plate 93 and attached to the mounting plate via a pair of screws 99, 99 which pass through mounting holes provided in the second and third projecting portions 85b and 85c. Each earphone cup 81 is received in a cup receptacle 83a of the receptacle casing 83. Furthermore, a tab 84 is integrally formed on the receptacle casing via a flexible inverse U-shaped portion 83b at a position opposing the end portion 95b of the rocking arm 95 which engages the ratchet portions 88, 88, 88. Thus, by depressing the tab 84, engagement of the rocking arm with a ratchet portion 88 is interrupted, causing the reel to spin for retracting a length of the cord 82. Thus, the reel 87, the rocking arm 95 the tension coil spring 96, the tab 84 and the U-shaped portion 83b collectively form the cord length adjusting means 90.

The earphone cup receptacle mechanisms 80, 80 are received at left and right sides of the front frame 10 respectively and the earphone cups 81 are arranged so as to slightly project from the cup receptacles 83a of the casing 83 so that the earphone cups 81 may be easily extracted by the user for inserting same into left and right ears when the head-mounted image display apparatus 1 is worn in a manner similar to goggles, or eyeglasses.

When the earphone cups 81, 81 are extracted from the earphone cup receptacle mechanisms 80, 80 the reels 87 thereof are rotated as the cord is drawn over the pulley 98, at this time, the reel will not apply winding force to the cord 82 since the rocking arm 95 is active to engage the ratchet portions 88, 88, 8E sequentially to prevent winding of the earphone cups 81, 81. The tab may be pressed to effect partial or complete retraction of the cord for establishing an optimal length of the retracted cord according to user preferences, also, since extracting force applied to the cord is mediated by the pulley 98, a strength and durability of the components of the earphone cup receptacle mechanisms 80, 80 including the cord 82 and the reel 87 may be improved and, since the cord bends around the pulley 98 the mechanism may be made more compact and easy and convenient to carry than if the cord is extracted directly along a tangent of the reel surface.

Thus, according to the head-mounted image display apparatus 1 of the invention, image dropout can be eliminated while independent adjustment of eye distance and focus may be easily accomplished. In addition, provision of the leaf springs creating frictional force applied to the adjustment sliders assures that the adjusted positions set by the user will be reliably maintained and, since a self lubricating material may be used on rib portions or backing plate portions of the adjustment mechanisms which work in conjunction with the frictional force applied by the leaf springs, smooth and fine adjustment may be easily accomplished.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as se forth in the appended claims.

What is claimed is:

1. A head-mounted image display apparatus wherein images from a pair of image display means provided in a device body are respectively provided to left and right eyes of a user in enlarged form, each image passing along an optical path including a reflector means disposed between a respective image display means and an ocular lens corresponding to each respective left and right eye, comprising:
   a pair of optical visual units, each visual unit respectively housing one of said image display means, said reflector means and said ocular lenses; and mounting means for adjustably mounting said pair of optical visual units along a horizontal direction. Wherein said optical visual units are respectively movable toward and away from each other along the horizontal direction, and each of said image display means is independently movable with respect to its respective optical visual unit; further comprising focusing means for moving each image display means in a vertical direction perpendicular to the horizontal direction relative to said respective optical visual unit.

2. A head-mounted image display apparatus as set forth in claim 1, wherein said mounting means comprises a shaft mounted within said device body to extend in said horizontal direction across a user's face, and said optical visual units are movable along said laterally mounted shaft provided in said device body.

3. A head-mounted image display apparatus as set forth in claim 1, wherein said ocular lenses respectively oppose said left and right eyes of said user at a fixed, predetermined distance therefrom, whereby image dropout may be avoided.

4. A head-mounted image display apparatus as set forth in claim 1, further including backlighting means operable such that illumination from a single light source is utilized for uniformly irradiating each of said image display means.

5. A head-mounted image display apparatus as set forth in claim 4, wherein said backlighting means is mounted above said optical visual units.

6. A head-mounted image display apparatus as set forth in claim 1, wherein said optical visual units are separable along the horizontal direction in a range between a first shorter separation distance and a second longer separation distance.

7. A head-mounted image display apparatus as set forth in claim 6, wherein said first shorter separation distance is established at 55 mm and said second longer separation distance is established at 75 mm.

8. A head-mounted image display apparatus as set forth in claim 1, wherein each reflector means is respectively mounted obliquely in said optical visual units below said image display means and said ocular lenses are vertically mounted in said optical visual units in a reflective path of said reflector means.

9. A head-mounted image display apparatus as set forth in claim 1, wherein horizontal movement of said optical visual units and vertical movement of said image display means are independent.

10. A head-mounted image display apparatus as set forth in claim 1, wherein manual adjustment means for effecting said lateral positional adjustment of said optical visual units and for effecting vertical positional adjustment of said focusing means for said image display means are provided at an outside surface of said device body.

11. A head-mounted image display apparatus as set forth in claim 10, wherein said manual adjustment means comprises a plurality of sliders.

12. A head-mounted image display apparatus as set forth in claim 11, wherein said sliders are slidable in left and right direction along the lateral direction and are provided on horizontally oriented portions of said outer surface of said device body.

13. A head-mounted image display apparatus as set forth in claim 1, wherein said display means comprises a pair of liquid crystal displays.

14. A head-mounted image display apparatus as set forth in claim 13, wherein said pair of liquid crystal displays are of a substantially thin transmission type.

15. A head-mounted image display apparatus as set forth in claim 11, wherein said sliders are mounted via self lubricating materials.

16. A head-mounted image display apparatus as set forth in claim 11, wherein said sliders are mounted via means of applying frictional force such that a predetermined resistance to sliding movement thereof is established.

17. A head-mounted image display apparatus as set forth in claim 1, wherein said device body may be mounted on a head of a user via horizontally extending bows provided on left and right sides thereof.

18. A head-mounted image display apparatus as set forth in claim 17, wherein a length of said bows is adjustable.

19. A head-mounted image display apparatus as set forth in claim 1, further including audio output means.

20. A head-mounted image display apparatus as set forth in claim 19, wherein said audio output means comprises headphone cups provided at left and right sides of said device body.

21. A head-mounted image display apparatus as set forth in claim 20, wherein said headphone cups are retractably held in retraction mechanisms mounted on left and right sides of said device body.

22. A head-mounted image display apparatus as set forth in claim 1, further including input means for supplying image signals to said display means from an external source.

23. A head-mounted image display apparatus as set forth in claim 21, wherein each of said retraction mechanisms includes a reel biased by a spring for retracting said headphone cup, wherein, said reel further includes a pair of contact terminals for receiving an input audio signal.

24. A head-mounted image display apparatus wherein images from a pair of image display means provided in a device body are respectively provided to left and right eyes of a user in enlarged form, each image passing along an optical path including a reflector means disposed between a respective image display means and an ocular lens corresponding to each respective left and right eye, comprising:

a pair of optical visual units, each visual unit respectively housing one of said image display means, said reflector means and said ocular lenses; and mounting means for adjustably mounting said pair of optical visual units along a horizontal direction, wherein said optical visual units are respectively movable toward and away from each other along the horizontal direction, and each of said image display means is independently movable with respect to its respective optical visual unit; wherein, said optical visual units housing said image display means are tilted relative to each other and to said mounting means such that a convergence angle is present in a viewing direction of a user between a left side mounted one of said display means and a right side mounted one of said display means.

25. A head-mounted image display apparatus as set forth in claim 24, wherein said convergence angle is established at between 2° and 8°.

26. A head-mounted image display apparatus wherein images from a pair of image display means provided in a device body are respectively provided to left and right eyes of a user in enlarged form, each image passing along an optical path including a reflector means disposed between a respective image display means and an ocular lens corresponding to each respective left and right eye, comprising:

a pair of optical visual units, each visual unit respectively housing one of said image display means, said reflector means and said ocular lenses; and mounting means for adjustably mounting said Pair of optical visual units along a horizontal direction, wherein said optical visual units are respectively movable toward and away from each other along the horizontal direction, and each of said image display means is independently movable with respect to its respective optical visual unit; wherein a convergence angle in a viewing direction is established by offsetting or tilting display surfaces of said image display means respectively mounted in each of said optical visual units with respect to each other.

27. A head-mounted image display apparatus as set forth in claim 26, wherein said convergence angle is established at between 2° and 8°.

28. A head-mounted image display apparatus wherein images from a pair of image display means provided in a device body are respectively provided to left and right eyes of a user in enlarged form, each image passing along an optical path including a reflector means disposed between a respective image display means and an ocular lens corresponding to each respective left and right eye, comprising:

a pair of optical visual units, each visual unit respectively housing one of said image display means, said reflector means and said ocular lenses; and mounting means for adjustably mounting said pair of optical visual units along a horizontal direction, wherein said optical visual units are respectively movable toward and away from each other along the horizontal direction, and each of said image display means is independently movable with respect to its respective optical visual unit; further including calibration means connected to said image display means comprising left and right calibration buttons operable such that when a right one of said calibration buttons is depressed a left one of said image display means becomes black and a right one of said image display means displays a test pattern and when a left one of said calibration buttons is depressed a right one of said image display means becomes black and a left one of said image display means displays a test pattern.

* * * * *